United States Patent [19]
Harpole et al.

[11] Patent Number: 6,158,983
[45] Date of Patent: Dec. 12, 2000

[54] PUMP HAVING MUFFLER FOR ATTENUATING NOISE

[75] Inventors: George M. Harpole, Torrance; Michael B. Petach, Redondo Beach, both of Calif.; Henry C. Sangret, St. Clair Shores, Mich.; Michael A. Jones, Redondo Beach, Calif.

[73] Assignee: TRW Inc., Lyndhurst, Ohio

[21] Appl. No.: 09/198,126

[22] Filed: Nov. 23, 1998

Related U.S. Application Data

[63] Continuation-in-part of application No. 08/847,571, Apr. 24, 1997, Pat. No. 5,961,309.

[51] Int. Cl.[7] .............................. F04B 17/03; F04C 2/18; F04C 13/00
[52] U.S. Cl. .................. 417/410.4; 418/181; 418/206.1; 310/67 R
[58] Field of Search ................................ 417/312, 410.4, 417/423.7; 418/181, 206.1, 206.4; 310/67 R; 181/198, 207

[56] References Cited

U.S. PATENT DOCUMENTS

| | | | |
|---|---|---|---|
| 3,909,165 | 9/1975 | Laumont | 418/102 |
| 4,174,196 | 11/1979 | Mori et al. | 418/9 |
| 4,486,160 | 12/1984 | Lipscombe | 418/270 |
| 4,752,195 | 6/1988 | Freidrich et al. | 418/181 |
| 5,201,878 | 4/1993 | Abe et al. | 418/181 |
| 5,240,393 | 8/1993 | Laumont | 418/132 |
| 5,401,150 | 3/1995 | Brown | 418/181 |
| 5,411,376 | 5/1995 | Fournier et al. | 417/312 |
| 5,692,883 | 12/1997 | Vourc'h | 418/181 |
| 5,810,568 | 9/1998 | Whitefield et al. | 417/423.7 |

FOREIGN PATENT DOCUMENTS

| | | | |
|---|---|---|---|
| 0542169 | 5/1993 | European Pat. Off. | 418/181 |
| 0748939 | 12/1996 | European Pat. Off. | |

OTHER PUBLICATIONS

SAE Technical Paper Series, 801005 "New Methods of Reducing Noise in External Gear Pumps", Hobbs, et al., Sep. 1980.

*Primary Examiner*—John J. Vrablik
*Attorney, Agent, or Firm*—Tarolli, Sundheim, Covell, Tummino & Szabo L. L. P.

[57] ABSTRACT

An apparatus (30) for use in pumping hydraulic fluid includes a pump unit (32) which is driven by an electric motor (34). The electric motor (34) is mounted on a tubular stem (108) which extends axially outward from a manifold plate (44). A stator (100) of the electric motor (34) is fixedly connected with the tubular stem (108). A rotor (112) of the electric motor (34) encloses the stator (100). A hydraulic muffler (50) attenuates noise produced by the gear pump unit (32). The hydraulic muffler (50) includes a channel (58) which extends into the manifold plate (44) from a major side surface (63) of the manifold plate. To increase the ability of the hydraulic muffler (50) to attenuate noise, one or two compliant elements (152 or 166 and 168) are connected with the channel (58).

100 Claims, 14 Drawing Sheets

6,158,983

PUMP HAVING MUFFLER FOR ATTENUATING NOISE

RELATED APPLICATION

This application is a continuation-in-part of application Ser. No. 08/847,571 filed Apr. 24, 1997, U.S. Pat. No. 5,961,309 by George M. Harpole et al. and entitled "Hydraulic Power Steering System with Noise Attenuation". The benefit of the earlier filing date of the aforementioned application Ser. No. 08/847,571 is hereby claimed.

BACKGROUND OF THE INVENTION

The present invention relates to an apparatus for pumping fluid and includes a pump unit and a hydraulic muffler which attenuates noise produced by the pump unit.

A known apparatus for use in pumping fluid is disclosed in U.S. Pat. No. 5,692,883. The apparatus disclosed in this patent includes a gear pump unit which is driven by an electric motor. A flexible duct is connected with the inlet to the gear pump unit. The flexible duct improves the absorption of sound waves generated by working of the gear pump unit. Another known gear pump unit is disclosed in U.S. Pat. No. 5,240,393.

A gear pump having a hydraulic muffler is disclosed in the aforementioned U.S. patent application Ser. No. 08/847,571 filed Apr. 24, 1997 by George M. Harpole, Michael B. Petch, and Nelson P. Mark and entitled "Hydraulic Power Steering System With Noise Attenuation". The apparatus disclosed in this application includes a gear pump having a fluid inlet and a hydraulic muffler. The hydraulic muffler attenuates noise by damping flow rate fluctuations that are caused by meshing gear teeth in the pump unit. The hydraulic muffler includes a compliant element and a conduit interposed between an inlet to the gear pump unit and a fluid reservoir.

SUMMARY OF THE INVENTION

The present invention relates to a new and improved apparatus for use in pumping hydraulic fluid. The apparatus includes a pump unit having an inlet and an outlet. A plate member is connected with the pump unit. An apparatus to attenuate noise produced by the pump unit includes a channel formed in the plate member. The channel is connected in fluid communication with an inlet to the pump unit.

An electric motor is provided to drive the pump unit. A stator of the electric motor may be mounted on a tubular stem connected with the plate member. A rotor may extend around the outside of the stator. A shaft connected with the rotor extends axially through the tubular stem and the stator and is connected with the pump unit.

One or more compliant elements may be connected with the channel formed in the plate member. The compliant elements are deflectable under the influence of fluid pressure to attenuate noise from the pump unit. The compliant elements may be located in cavities in the plate member.

BRIEF DESCRIPTION OF THE DRAWINGS

The foregoing and other features of the present invention will become apparent to those skilled in the art to which the present invention relates from reading the following description with reference to the accompanying drawings, in which.

DESCRIPTION OF SPECIFIC PREFERRED EMBODIMENTS OF THE INVENTION

General Description

Figure 1:
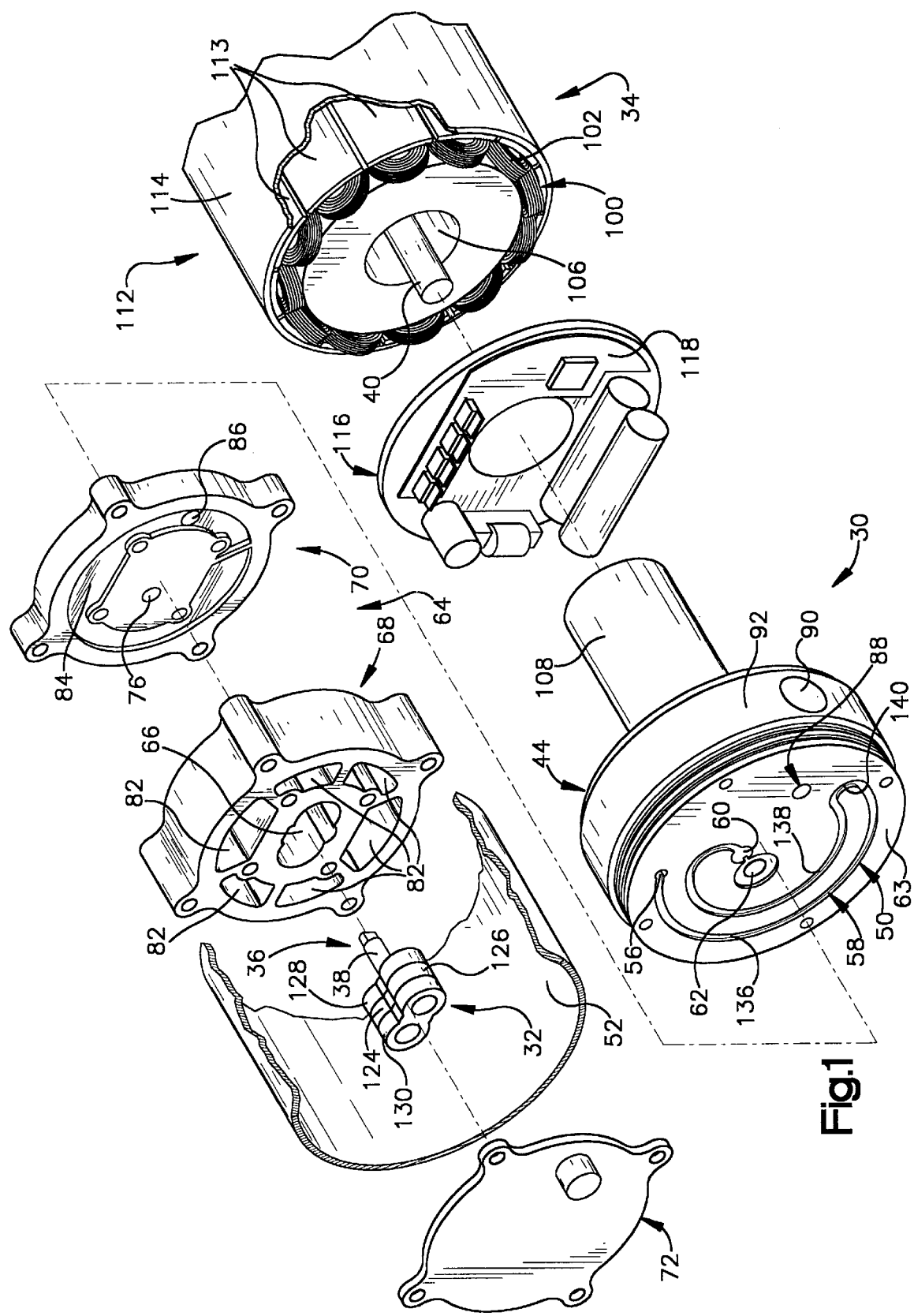
FIG. 1 is an exploded simplified schematic illustration of an apparatus constructed in accordance with the present invention to pump hydraulic fluid.

An apparatus 30 for use in pumping hydraulic fluid is illustrated schematically in FIG. 1. Although the apparatus 30 may be used in many different environments, it is believed that the apparatus is particularly well suited to supplying power steering fluid to a hydraulically assisted rack and pinion steering gear. If the apparatus 30 is used in association with a rack and pinion steering gear, the apparatus provides fluid pressure to operate a power steering motor in response to actuation of a vehicle steering wheel. Operation of the power steering motor turns steerable vehicle wheels in a known manner.

The apparatus 30 includes a pump unit 32 which is driven by an electric motor 34. A drive shaft 36 transmits rotational force (torque) from the electric motor 34 to the pump unit 32. The drive shaft 36 includes an input shaft 38 to the pump unit 32 and an output shaft 40 from the electric motor 34. The pump unit input shaft 38 and electric motor output shaft 40 are disposed in a coaxial relationship and are fixedly connected with each other.

A rigid metal manifold plate 44 (FIG. 1) is disposed between and is connected to the pump unit 32 and the electric motor 34. The drive shaft 36 extends through the manifold plate 44. Hydraulic fluid is conducted to and from the pump unit 32 through the manifold plate 44.

Hydraulic Muffler

During operation of the pump unit 32 (FIG. 1), hydraulic fluid pressure fluctuations produced by the pump unit result in the generation of noise. To attenuate the noise, a hydraulic muffler 50 is provided between an inlet to the pump unit 32 and a reservoir 52 which holds hydraulic fluid. Hydraulic fluid in the reservoir 52 is exposed to an inlet end 56 of the hydraulic muffler 50.

In accordance with one of the features of the invention, the hydraulic muffler 50 includes a channel 58 formed in the manifold plate 44. The channel 58 has a serpentine configuration and conducts hydraulic fluid to an outlet end 60 of the hydraulic muffler 50. A flow of hydraulic fluid in the channel 50 is effective to attenuate noise produced by the pump unit 32.

The outlet end 60 of the hydraulic muffler 50 is disposed adjacent to and is connected in fluid communication with an opening 62 formed in the manifold plate 44. The input shaft 38 to the pump unit 32 extends into the opening 62 and is connected with the output shaft 40 from the electric motor 34 at the opening. The hydraulic fluid from the channel 58 flows from the opening 62 along the input shaft 38 of the pump unit 32 to an inlet opening to the pump unit 32.

The channel 58 has a longitudinal central axis which extends parallel to a flat major side surface 63 on the manifold plate 44. The channel 58 has a uniform depth throughout the extent of the channel. The channel 58 has a curving configuration with a center of curvature which is offset to one side of the opening 62 and is located in a central portion of the manifold plate 44. The longitudinal central axis of the channel 58 extends perpendicular to the axis about which the drive shaft 36 rotates.

During operation of the pump unit 32, fluid pressure fluctuations generated by the pump unit are resisted by the inertia of fluid flowing toward the pump unit through the channel 58. The inertia of the fluid flowing in the restricted confines of the channel 58 inhibits the transmittal of fluid pressure fluctuations from an inlet opening to the pump unit 32. Inhibiting the transmittal of pressure fluctuations through the flow of fluid to the pump unit 32 reduces the amount of noise which emanates from the pump unit during operation of the apparatus 30.

In the embodiment of the invention illustrated in FIG. 1, the pump unit 32 is part of a pump assembly 64. The pump unit 32 is disposed in a pump chamber 66 formed in a rigid metal body section 68 of the pump assembly 64. One end of the body section 68 is closed by a rigid metal lower cover plate 70. The opposite end of the body section 68 is closed by a rigid metal upper cover plate 72.

During operation of the pump unit 32 in the pump chamber 66 of the body section 68, the pump unit induces hydraulic fluid to flow from the reservoir 52 to the inlet end 56 of the hydraulic muffler 50. The hydraulic fluid then flows along the channel 58 to the outlet end 60 of the hydraulic muffler 50 and the opening 62. The hydraulic fluid then flows along the drive shaft 36 through an inlet opening 76 in the lower cover plate 70. The hydraulic fluid flows from the inlet opening 76 into the pump chamber 66 and the inlet to the pump unit 32.

During operation of the pump unit 32, high-pressure fluid is directed from the pump chamber 66 toward the inner side of the upper cover plate 72. The high pressure fluid discharged from the pump unit 32 flows outward in a recess (not shown) formed in the inner side of the upper cover plate 72 to resonator passages 82 which extend axially through the body section 68 outside of the pump chamber 66. The high-pressure fluid from the resonator passages 82 is collected in a recess 84 formed in the inner side of the lower cover plate 70.

The high pressure fluid is conducted from the recess 84 through a single outlet passage 86 in the lower cover plate 70 to an outlet passage 88 formed in the manifold plate 44. The high-pressure fluid is conducted from the outlet passage 88 through an opening 90 formed in a cylindrical outer side 92 of the manifold plate 44. When the apparatus 30 is utilized in association with a power steering system for a vehicle, the high pressure fluid is conducted from the opening 90 to a power steering control valve which is actuated in response to rotation of a vehicle steering wheel.

Electric Motor

The electric motor 34 (FIG. 1) is operable to drive the pump unit 32. The electric motor 34 includes a stator 100 having a generally cylindrical configuration. The stator 100 includes a plurality of windings 102 disposed in an annular array about a longitudinal central axis of the stator. The stator 100 has a cylindrical central passage 106 which extends axially through the stator.

In accordance with one of the features of the invention, the stator 100 is fixedly connected with a cylindrical tubular stem 108 which extends axially outward from the manifold plate 44 in a direction away from the pump unit 32. The stator 100 is telescopically received over the outside of the stem 108 and is fixedly connected to the stem. The stator 100 has a central axis which is coincident with the central axes of the tubular stem 108 and drive shaft 36.

A cylindrical rotor 112 extends around the outside of the stator 100. The rotor 112 encloses the stator 100. The cylindrical rotor 112 is disposed in a coaxial relationship with the stator 100 and the stem 108. The rotor 112 includes a plurality of magnets 113 which are fixedly secured to a cylindrical housing 114. The rotor 112 is rotatable about the central axis of the stator 100. The coincident central axes of the rotor 112 and stator 100 extends perpendicular to the major side surface 63 of the manifold plate 44.

The motor output shaft 40 is fixedly connected with an axial end of the rotor 112 which is furthest from the manifold plate 44. The output shaft 40 extends axially through the passage 106 in the stator 100 and through the stem 108 on the manifold plate 44. The motor output shaft 40 is connected to the pump input shaft 38 at the opening 62 in the manifold plate 44.

Motor control circuitry 116 is mounted on an annular plate 118. The motor control circuitry 116 is disposed between the manifold plate 44 and the stator 100. The motor control circuitry 116 controls the operation of the electric motor 34.

During operation of the apparatus 30 to supply fluid under pressure, the motor control circuitry 116 effects energization of the electric motor 34. This results in rotation of the rotor 112 and output shaft 40 about their coincident longitudinal central axes. This drives the pump unit 32 to provide hydraulic fluid under pressure.

Pump Unit

Although the pump unit 32 (FIG. 1) may have many different constructions, the illustrated pump unit is a gear pump having a pair of meshing gears 124 and 126. The gears 124 and 126 are enclosed by a pair of bearing plates 128 and 130. The gear 124 is fixedly connected to and is coaxial with the input shaft 38. The input shaft 38 extends through the inlet opening 76 in the lower cover plate 70 and is connected to the motor output shaft 40. The central axis of the pump input shaft 38 extends perpendicular to the major side surface 63 of the manifold plate 44.

During operation of the pump unit 32, the meshing gears 124 and 126 cause fluctuations in the rate of flow of hydraulic fluid from the pump unit 32. These fluctuations result in fluid pressure pulses at the inlet to the pump unit 34. The fluid pressure pulses occur at frequencies which vary with the frequencies with which the teeth of the gears 124 and 126 move into and out of meshing engagement at a nip between the gears.

The fluid pressure pulses tend to propagate outward from the inlet opening to the pump unit 32. However, propagation of the fluid pressure pulses is resisted by the inertia of the hydraulic fluid flowing through the serpentine channel 58 formed in the manifold plate 44. The resistance to propagation of the fluid pressure pulses provided by the hydraulic fluid in the channel 58 minimizes the amount of noise conducted from the pump unit 32.

The specific serpentine channel 58 illustrated in FIG. 1 has an arcuate inlet portion 136 which is connected in fluid communication with the inlet 56 to the hydraulic muffler 50. The channel 58 has an arcuate outlet portion 138 which is connected in fluid communication with the outlet end 60 of the hydraulic muffler 50. The arcuate inlet and outlet portions 136 and 138 are interconnected by a connector portion 140.

The channel 58 is formed in the rigid metal manifold plate 44. The channel 58 is closed by the rigid metal lower cover plate 70 which extends across the channel. Thus, the serpentine channel 58 is formed in the manifold plate 44 (formed by a valley) being sealed by a flat lower cover plate 70. The rigid manifold plate 44 and cover plate 70 prevent flexing of the channel 58 under the influence of fluid pressure pulses to further minimize noise propagation.

The channel 58 of the hydraulic muffler 50 extends inward from the flat circular major side surface 63 on the manifold plate 44. The lower cover plate 70 has a flat major side surface which extends across the channel 58 to form a conduit through which hydraulic fluid is conducted. The lower cover plate 70 does not extend across the inlet end 56 of the hydraulic muffler 50, Therefore, hydraulic fluid from the reservoir 52 can flow into the channel 58 during operation of the pump unit 32. The arcuate inlet and outlet portions 136 and 138 of the channel 58 have centers of curvature which are disposed adjacent to the opening 62.

Hydraulic Muffler—Compliant Element

Figure 2:
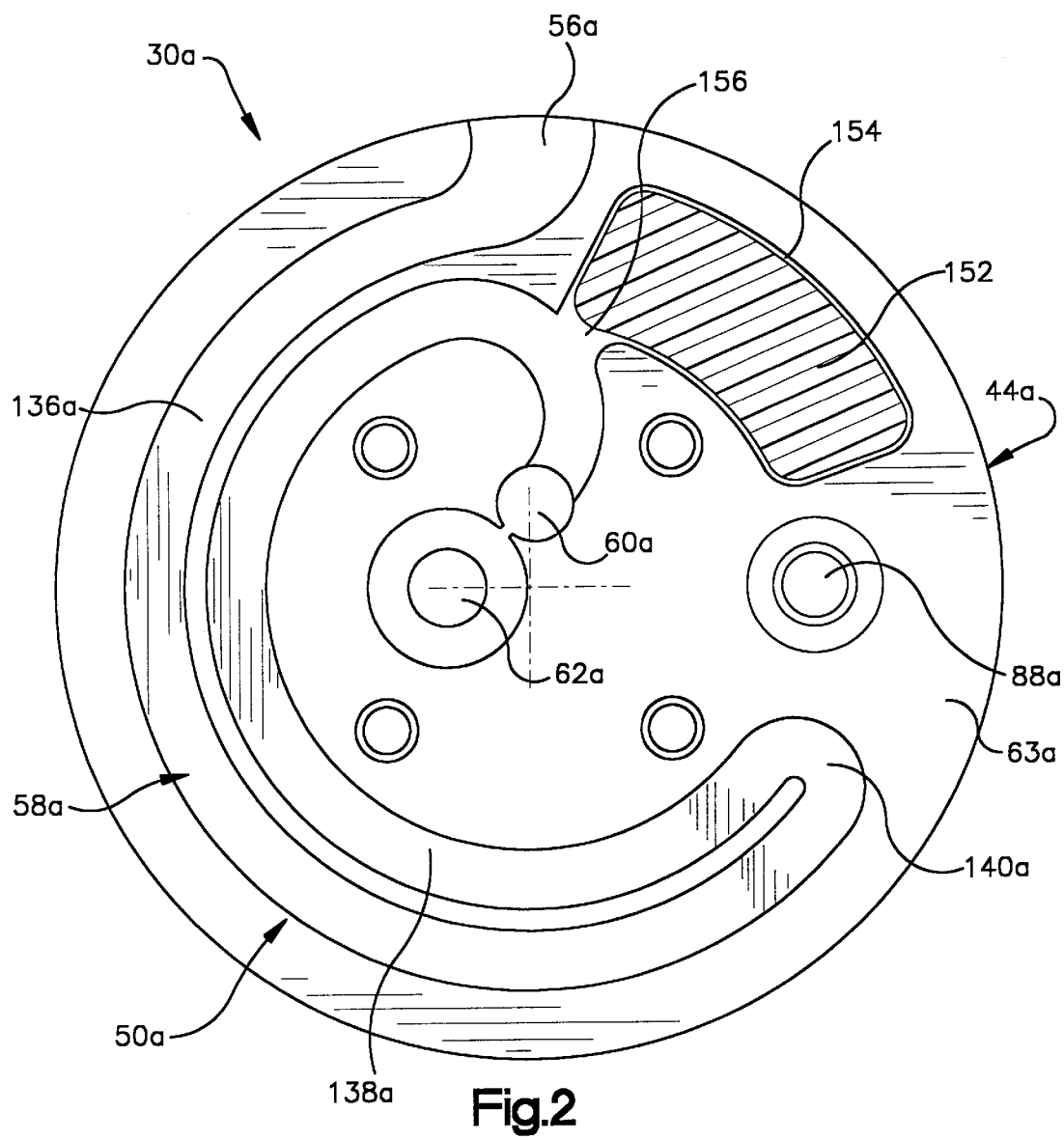
FIG. 2 is an enlarged plan view of a major side surface of a second embodiment of a manifold plate used in the apparatus of FIG. 1.

In the embodiment of the invention illustrated in FIG. 1, the apparatus 30 includes a hydraulic muffler 50 which relies upon the inertia of hydraulic fluid being conducted through the channel 58 to the inlet of the pump unit 32 to attenuate noise from the pump unit. In the embodiment of the invention illustrated in FIG. 2, the hydraulic muffler includes a compliant element which cooperates with the channel to attenuate noise produced by operation of the pump unit. Since the embodiment of the invention illustrated in FIG. 2 is generally similar to the embodiment of the invention illustrated in FIG. 1, similar numerals will be utilized to designate similar components, the suffix letter "a" being associated with the numerals of FIG. 2 to avoid confusion.

An apparatus 30*a* (FIG. 2) for use in pumping hydraulic fluid includes a rigid metal manifold plate 44*a* and a hydraulic muffler 50*a*. The hydraulic muffler 50*a* includes a serpentine channel 58*a* which extends inward from a major side surface 63*a* of a rigid metal manifold plate 44*a*. The serpentine channel 58*a* is sealed by a flat cover plate, corresponding to the cover plate 70 of FIG. 1. The serpentine channel 58*a* is formed by a valley in the manifold plate 44*a*.

The hydraulic muffler 50*a* has an inlet end 56*a* and an outlet end 60*a*. The outlet end 60*a* of the hydraulic muffler 50*a* is connected with an opening 62*a* which extends through the manifold plate 44*a*. The opening 62*a* is connected in fluid communication with a pump unit (not shown), corresponding to the pump unit 32 of FIG. 1.

During operation of the pump unit 32, fluid flow is conducted to the inlet end 56*a* of the hydraulic muffler from a reservoir (not shown), corresponding to the reservoir 52 of FIG. 1. The hydraulic fluid is conducted through the hydraulic muffler 50*a* (FIG. 2) to the opening 62*a*. The hydraulic fluid is conducted from the opening 62*a* to the inlet of the pump unit. High pressure hydraulic fluid is conducted from the pump unit to an outlet passage 88*a* in the manifold plate 44*a*.

The channel 58*a* (FIG. 2) includes an arcuate inlet portion 136*a* which is connected with the inlet 56*a* to the hydraulic muffler 50*a*. In addition, the channel 58*a* includes an arcuate outlet portion 138*a* which is connected with the outlet 60*a* from the hydraulic muffler 50*a*. A connector portion 140*a* interconnects the inlet and outlet portions 136*a* and 138*a* of the channel 58*a*.

The inlet and outlet portions 136*a* and 138*a* of the channel 58*a* have arcuately curving configurations. The inlet and outlet portions 136*a* and 138*a* have spaced-apart centers of curvature disposed in a central portion of the manifold plate 44*a* adjacent to the opening 62*a*.

The channel 58*a* has a longitudinal central axis which extends parallel to the major side surface 63*a* of the manifold plate 44*a*. The channel 58*a* has a uniform depth.

In accordance with a feature of this embodiment of the invention, a compliant element 152 (FIG. 2) is disposed in a cavity 154 in the manifold plate 44*a*. In the illustrated embodiment of the invention, the compliant element 152 is formed by a body of resiliently compressible material. The resiliently compressible material of the compliant element 152 may be foam rubber. If desired, the compliant element 152 could be formed in a different manner. For example, the compliant element 152 could be formed by a resiliently deflectable diaphragm extending across the cavity 154.

The cavity 154 is connected with the channel 58*a* through a passage 156. A rigid metal lower cover plate (not shown) corresponding to the lower cover plate 70 of FIG. 1, is disposed in engagement with the flat major side surface 63*a* of the manifold plate 44*a* to close the passage 156 and the cavity 154. The lower cover plate extends across the channel 58*a* to close the channel. The lower cover plate does not block the inlet end 56*a* of the hydraulic muffler 50*a*. Therefore, hydraulic fluid can flow through the inlet 56*a*, along the channel 58*a* and through the outlet 60*a* to the opening 62*a*.

During operation of an electric motor (not shown), corresponding to the electric motor 34, of FIG. 1, meshing gear teeth in the pump unit cause fluctuations in the hydraulic fluid conducted to the inlet to the pump unit. These fluctuations result in pressure pulses in the flow of fluid to the inlet of the pump unit. In accordance with a feature of the embodiment of the invention illustrated in FIG. 2, propagation of the pressure pulses is resisted by the combined effect of inertia of fluid flowing through the channel 58*a* and the compliant element 152.

Upon an increase in the fluid pressure conducted through the channel 58a, the compliant element 152 is resiliently deflected to compress the compliant element. This increases the volume of the cavity 154 which is not occupied by the compliant element 152. As the compliant element 152 is compressed, fluid flows into the cavity 154 to attenuate the increase in fluid pressure in the channel 58a.

The combination of the compliant element 152 and the channel 58a enables the hydraulic muffler 50a to attenuate noise resulting from operation of the pump unit 32a. Thus, the flow of fluid through the channel 58a provides inertia which reduces the amount of back pressure transmitted through the channel. The resilient deflection of the compliant element 152 results in the volume of fluid in the cavity 154 increasing to absorb fluid pressure waves in the flow of fluid in the channel 58a. Of course, when a fluid pressure pulse in the channel 58a has passed, the compliant element 152 expands and fluid is discharged from the cavity 154 into the flow of fluid in the channel 58a. The compliant element 152 dampens fluid pressure pulses and tends to maintain a constant rate of flow of hydraulic fluid in the channel 58a by enabling hydraulic fluid to flow into and out of the cavity 154.

By forming the cavity 154 and the channel 58a in the rigid metal manifold plate 44a, the side walls of the channel and the side walls of the cavity do not flex under the influence of variations in fluid pressure. This blocks pressure fluctuations from propagating outwardly from the channel 58a and cavity 154 in response to variations in fluid pressure at the inlet to the gear pump unit.

Although only the manifold plate 44a is illustrated in FIG. 2, it should be understood that the apparatus 30a of FIG. 2 has the same general construction as the apparatus 30 of FIG. 1. A pump assembly, corresponding to the pump assembly 64 of FIG. 1, is connected with the manifold plate 44a. An electric motor, corresponding to the electric motor 34 of FIG. 1, is connected with a tubular stem which extends from the manifold plate 44a in a direction away from the pump assembly.

Muffler—Plural Compliant Elements

In the embodiment of the invention illustrated in FIG. 2, the muffler 50a has a single compliant element 152. It is believed that the embodiment of the invention illustrated in FIG. 3 may achieve a significant increase in noise attenuation by the use of a plurality of compliant elements. Since the embodiment of the invention illustrated in FIG. 3 is generally similar to the embodiments of the invention illustrated in FIGS. 1 and 2, similar numerals will be utilized to designate similar components, the suffix letter "b" being associated with the numerals of FIG. 3 to avoid confusion.

An apparatus 30b (FIG. 3) for use in pumping hydraulic fluid includes a rigid metal manifold plate 44b. The manifold plate 44b cooperates with a rigid metal lower cover plate (not shown) to form a hydraulic muffler 50b. The hydraulic muffler 50b has an inlet 56b. The inlet 56b is not blocked by the lower cover plate and is exposed to hydraulic fluid in a reservoir, corresponding to the reservoir 52 of FIG. 1. The hydraulic muffler 50b has an outlet 60b in one side of an opening 62b in the manifold plate 44b.

Figure 3:
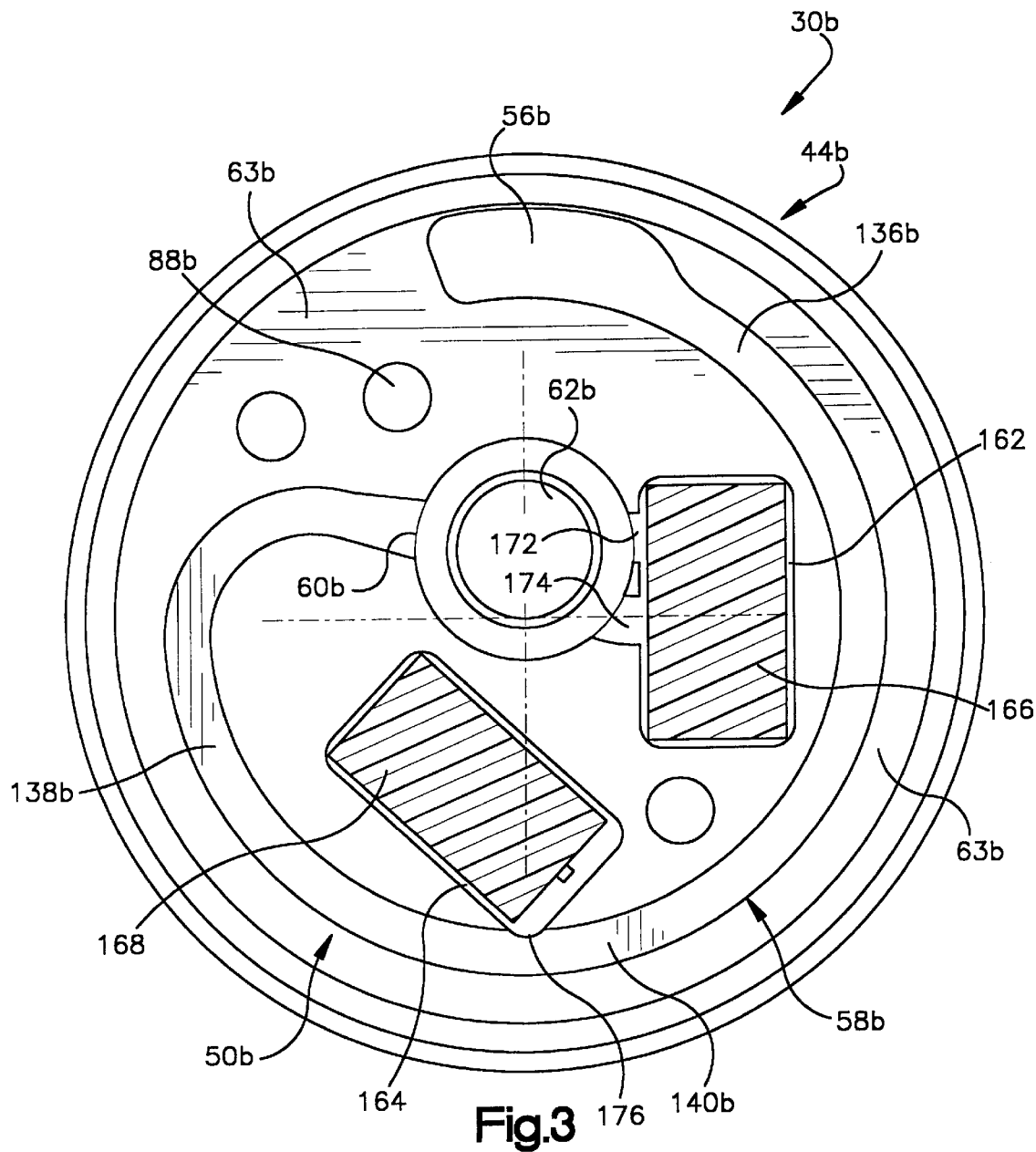
FIG. 3 is a plan view, generally similar to FIG. 2, illustrating another embodiment of the manifold plate.

An electric motor output shaft, corresponding to the motor output shaft 40 of FIG. 1, is connected with the pump unit input shaft, corresponding to the input shaft 38 of FIG. 1 at the opening 62b (FIG. 3). During operation of the pump unit, a flow of hydraulic fluid is conducted from the reservoir, through the hydraulic muffler 50b to the opening 62b. This fluid then flows to the inlet of a pump unit having the same general construction as the pump unit 32 of FIG. 1. Hydraulic fluid flows from an outlet from the pump unit to an outlet passage 88b in the manifold plate 44b.

The hydraulic muffler 50b (FIG. 3) includes a serpentine channel 58b which extends inward from a flat major side surface 63b on the rigid metal manifold plate 44b. The serpentine channel 58b is sealed by a flat cover plate, corresponding to the cover plate 70 of FIG. 1. The serpentine channel 58b is formed by a valley in the manifold plate 44b.

The serpentine channel 58b has a smooth arcuate configuration with a plurality of spaced-apart centers of curvature disposed adjacent to the opening 62b. The channel 58b has an inlet portion 136b which is connected with an outlet portion 138b by a smooth continuously curving connector portion 140b. The smooth configuration of the channel 58b facilitates a flow of fluid through the channel.

In accordance with one of the features of this embodiment of the invention, the channel 58b has a shorter length and fewer bends than the channel 58 of FIG. 1. In one specific embodiment of the channel 58 of FIG. 1, the channel had a length of approximately 430 millimeters. In one specific embodiment of the channel 58b of FIG. 3, the channel has a length of approximately 210 millimeters. The relatively long channel 58 of FIG. 1 had a first resonance at approximately 1,520 hertz which may result in amplification of some noise conducted from the inlet to the pump unit. By reducing the length of the channel 58b to approximately 210 millimeters, the resonance is increased to 3.1 kHz. This results in the channel 58b being ineffective to amplify pump resonance frequencies which are significantly below 3.0 kHz.

In accordance with another feature of this embodiment of the invention, a plurality of cavities are provided to hold a plurality of compliant elements to minimize variations in the fluid pressure in the channel 58b (FIG. 3). In the illustrated embodiment of the invention, cavities 162 and 164 are formed in the manifold plate 44b. A compliant element 166 is disposed in the cavity 162 and a second compliant element 168 is disposed in the cavity 164. The compliant elements 166 and 168 are formed of a resiliently compressible material.

Although the compliant elements 166 and 168 and cavities 162 and 164 could have different configurations, it is preferred to form them with a rectangular configuration. The rectangular configuration of the compliant elements 166 and 168 facilitates forming the compliant elements from extruded or cut foam rubber. The rectangular configuration of the cavities 162 and 164 facilitates formation of the cavities in the manifold plate 44b.

The cavity 162 is connected with the opening 62b and the outlet end 60b of the hydraulic muffler 50b by a pair of passages 172 and 174. The outlet end 60b of the hydraulic muffler 50b and channel 58b is disposed diametrically across the opening 62b from the inlet passages 172 and 174 to the cavity 162. Therefore, a pressure pulse conducted from the pump unit to the opening 62b will enter the cavity 162 at the same time that the pressure pulse enters the inlet 60b to the hydraulic muffler 50b. This reduces the magnitude of a pressure pulse which must be resisted by the inertia of the flow of hydraulic fluid in the channel 58b.

The cavity 164 is connected with the connector portion 140b of the channel 58b by a single passage 176. The passage 176 is connected with the channel 58b at a location which is close to but not exactly at the middle of the length of the channel 58b. Thus, the passage 176 is disposed slightly closer to the outlet end 60b of the hydraulic muffler 50b than to the inlet end 56b of the muffler. By offsetting the passage 176 from the middle of the length of the channel 58b, the high frequency resonance is dispersed through two frequencies (both at a lower amplitude). The passage 176 has a width of approximately 3.5 millimeters.

The cavities 162 and 164 and the channel 58b are blocked by a lower side surface of a rigid metal lower cover plate, corresponding to the cover plate 70 of FIG. 1. The channel 58b has a longitudinal axis which extends parallel to the major side surface 63b of the manifold plate. The channel 58b has a uniform depth throughout the length of the channel.

During operation of a pump unit, corresponding to the pump unit 32, meshing gears in the pump unit create fluid pressure fluctuations at the inlet to the pump unit. The fluid pressure fluctuations are transmitted from the inlet of the pump unit to the channel 58b. The inertia of the flow of hydraulic fluid in the channel 58b dampens the fluid pressure fluctuations.

In addition, a fluid pressure surge at the inlet to the pump unit is conducted to the cavities 162 and 164. The increased fluid pressure in the cavities 162 and 164 resiliently deflects the compliant elements 166 and 168. As the compliant elements 166 and 168 are deflected, the volumes of the cavities occupied by the compliant elements 166 and 168 decreases. This enables the volume of hydraulic fluid in the cavities to increase. By increasing the volume of hydraulic fluid in the cavities 162 and 164, the pressure pulse is further dampened.

After the pressure pulse has passed, the compliant elements 166 and 168 expand and discharge fluid from the cavities 162 and 164 to the channel 58b. Discharging of hydraulic fluid from the cavities 162 and 164 tends to maintain the rate of flow of hydraulic fluid in the channel 58b constant. This attenuates noise produced by variations in the rate of flow of hydraulic fluid past the gears in the pump unit.

The combined effect of the two compliant elements 166 and 168 and the inertia of the fluid in the channel 58b is effective to substantially attenuate noise from the pump unit. It is believed that the provision of two cavities 162 and 164 at spaced-apart locations along the length of the channel 58b may result in greater noise attenuation than can be achieved with only one cavity and compliant element. Of course, more than two cavities 162 and 164 and compliant elements 166 and 168 could be provided at the spaced-apart locations along the length of the channel 58b.

In the embodiment of the invention illustrated in FIG. 3, the compliant elements 166 and 168 are formed of a resiliently compressible material, such as foam rubber. However, it is contemplated that the compliant elements could be formed in a different manner if desired. For example, a resiliently deflectable diaphragm could be provided in each of the cavities 162 and 164 to form the compliant elements.

Although only the manifold plate 44b is illustrated in FIG. 3, it should be understood that the apparatus 30b of FIG. 3 has the same general construction as the apparatus 30 of FIG. 1. A pump assembly, corresponding to the pump assembly 64 of FIG. 1, is connected with the manifold plate 44b. An electric motor, corresponding to the electric motor 34 of FIG. 1, is connected with a tubular stem which extends from the manifold plate 44b in a direction away from the pump assembly.

Muffler—Irregularly Shaped compliant Element

Figure 4:
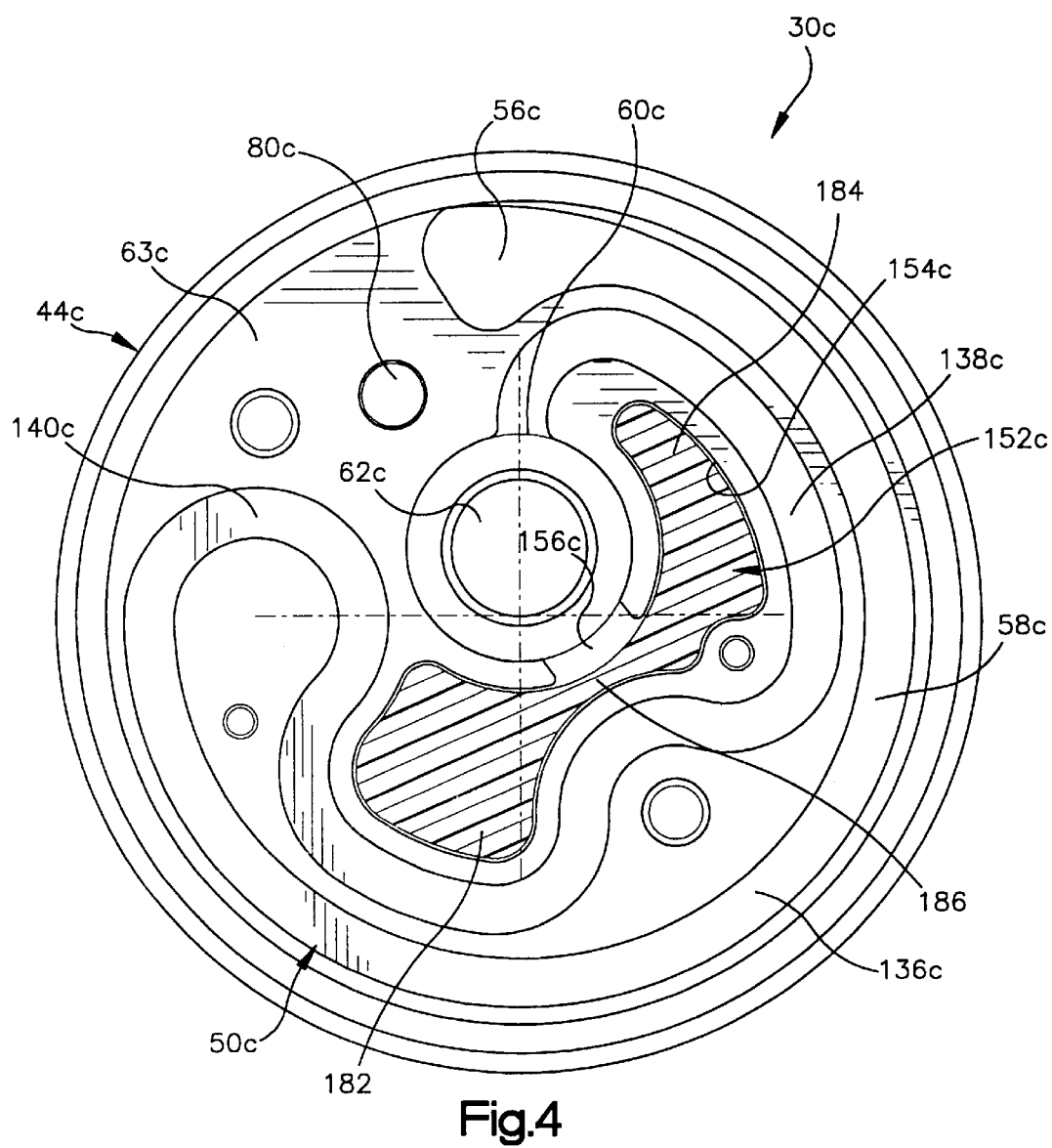
FIG. 4 is a plan view, generally similar to FIGS. 2 and 3, illustrating another embodiment of the manifold plate.

In the embodiment of the invention illustrated in FIG. 3, two rectangular compliant elements 166 and 168 are provided in two separate rectangular cavities 162 and 164. In the embodiment of the invention illustrated in FIG. 4, a single irregularly-shaped compliant element is provided in a single cavity. Since the embodiment of the invention illustrated in FIG. 4 is generally similar to the embodiment of the invention illustrated in FIGS. 1–3, similar numerals will be utilized to designate similar components, the suffix letter "c" being associated with the numerals of FIG. 4 to avoid confusion.

An apparatus 30c (FIG. 4) for use in pumping hydraulic fluid includes a rigid metal manifold plate 44c. The manifold plate 44c (FIG. 4) has a hydraulic muffler 50c to attenuate noise resulting from pressure fluctuations at the inlet to a pump unit corresponding to the pump unit 32 of FIG. 1. The hydraulic muffler 50c of FIG. 4 includes an inlet 56c and an outlet 60c. A serpentine channel 58c extends between the inlet 56c and the outlet 60c. The serpentine channel 58c is sealed by a flat cover plate, corresponding to the cover plate 70 of FIG. 1. The serpentine channel 58c is formed by a valley in the manifold plate 44c.

The serpentine channel 58c extends inwardly from a flat major side surface 63c on the manifold plate 44c. The channel 58c is connected in fluid communication with the inlet to the pump unit through an opening 62c. An outlet from the pump unit is connected with an outlet passage 88c in the manifold plate 44c.

The channel 58c includes an inlet portion 136c and an outlet portion 138c. The inlet and outlet portions 136c and 138c of the channel 58c are interconnected by a connector portion 140c. The inlet portion 136c of the channel 58c has an arcuately curving arcuate configuration. However, the outlet portion 138c of the channel 58c has an irregularly curving configuration. A longitudinal central axis of the channel 58c extends parallel to the flat major side surface 63c of the manifold plate 44c.

An irregularly-shaped compliant element 152c is disposed in an irregularly-shaped cavity 154c in the manifold plate 44c. The cavity 154c is connected with the opening 62c through an inlet passage 156c. The compliant element 152c is formed of a resiliently compressible material, such as foam rubber. The cavity 154c and channel 58c are blocked by a rigid metal lower cover plate, corresponding to the lower cover plate 70 of FIG. 1. However, the lower cover plate does not block the inlet end 56c of the channel 58c.

The compliant element 152c has an irregular configuration. The compliant element includes a first main lobe or section 182 which is connected with a second main lobe or section 184 by a connector section 186. The inlet passage 156c is disposed adjacent to the connector section 186 of the compliant element 152c.

Hydraulic fluid conducted through the inlet passage 156c engages and compresses the connector section 186 of the compliant element 152c. The hydraulic fluid then flows in opposite directions from the connector section 186 to the first and second main sections 182 and 184 of the compliant element 152c. The hydraulic fluid engages and compresses the first and second main sections 182 and 184 of the compliant element 152c. By compressing the connector section 186 and first and second main sections 182 and 184 of the compliant element 152c, the volume of the compliant element is decreased and the amount of hydraulic fluid in the cavity 154c increases.

The inlet passage 156c is connected to the opening 62c at a location diametrically across from the outlet 60c from the hydraulic muffler 58c. When a pressure pulse is conducted from the inlet to the pump unit to the opening 62c, the pressure pulse can enter both the cavity 154c and the channel 58c. Since the portion of the pressure pulse is dampened by entering the cavity 154c and compressing the compliant element 152c, only the remaining portion of the pressure pulse must be dampened by the inertia of the flow of hydraulic fluid in the chamber 50c.

During operation of the pump unit, corresponding to the pump unit 32 of FIG. 1, pressure fluctuations are formed at the inlet to the pump unit. These pressure fluctuations are conducted to the opening 62c and the channel 58c. The pressure fluctuations are dampened by the inertia of the flow of fluid in the channel 58c. In addition, the pressure fluctuations are conducted through the passage 156c to the cavity 154c. The pressure fluctuations are effective to resiliently compress the compliant element 152c. As the compliant element 152c is compressed, hydraulic fluid flows into the cavity 154c to further dampen the pressure pulses.

Although only the manifold plate 44c is illustrated in FIG. 4, it should be understood that the apparatus 30c of FIG. 4 has the same general construction as the apparatus 30 of FIG. 1. A pump assembly, corresponding to the pump assembly 64 of FIG. 1, is connected with the manifold plate 44c. An electric motor, corresponding to the electric motor 34 of FIG. 1, is connected with a tubular stem which extends from the manifold plate 44c in a direction away from the pump assembly.

In the embodiments of the invention illustrated in FIGS. 1–4, the channels 58, 58a, 58b and 58c are open channels which extend inward from a major side surface 63, 63a, 63b, or 63c of a manifold plate. If desired, the channels could be formed in a different manner. For example, the channels could be closed channels formed by cast or machined passages disposed within the manifold plates.

In the embodiments of the invention illustrated in FIGS. 2–4, the cavities 154, 162, 164, and 154c are open cavities which extend inward from a major side surface 63a, 63b, or 63c of a manifold plate. If desired, the cavities could be formed in a different manner. For example, the cavities could be closed cavities formed by cast or machined cavities disposed within the manifold plates.

Apparatus for Pumping Fluid

The apparatus 30 for pumping fluid has been illustrated schematically in FIG. 1. One specific embodiment of the apparatus for pumping fluid is illustrated in FIGS. 5 through 21. Since the embodiment of the apparatus illustrated in FIGS. 5 through 21 is generally the same as the embodiment of the apparatus illustrated in FIG. 1, similar numerals will be utilized to designate similar components, the suffix letter "d" being associated with the numerals of FIG. 5 to avoid confusion.

An apparatus 30d (FIG. 5) for pumping hydraulic fluid includes a pump unit 32d and an electric motor 34d. The electric motor 34d is operable to drive the pump unit 32d to pump hydraulic fluid. The electric motor 34d is connected with the pump unit 32d by a drive shaft 36d.

The drive shaft 36d includes a pump input shaft 38d and a motor output shaft 40d. The pump input shaft 38d and motor output shaft 40d are disposed in a coaxial relationship. The pump input shaft 38d and motor output shaft 40d are fixedly interconnected by a connector 200. The connector 200 is disposed in an opening 62d in a rigid metal manifold plate 44d. The pump input shaft 38d and motor output shaft 40d extend perpendicular to the major side surface of the manifold plate 44d.

The electric motor 34d is enclosed by a sheet metal housing 202. The pump unit 32d is enclosed by a sheet metal housing 204. The sheet metal housing 204 cooperates with the manifold plate 44d to form a reservoir 52d for hydraulic fluid. A removable cover 208 is provided on the housing 204 to enable the reservoir 52d to be filled with hydraulic fluid.

Figure 12:
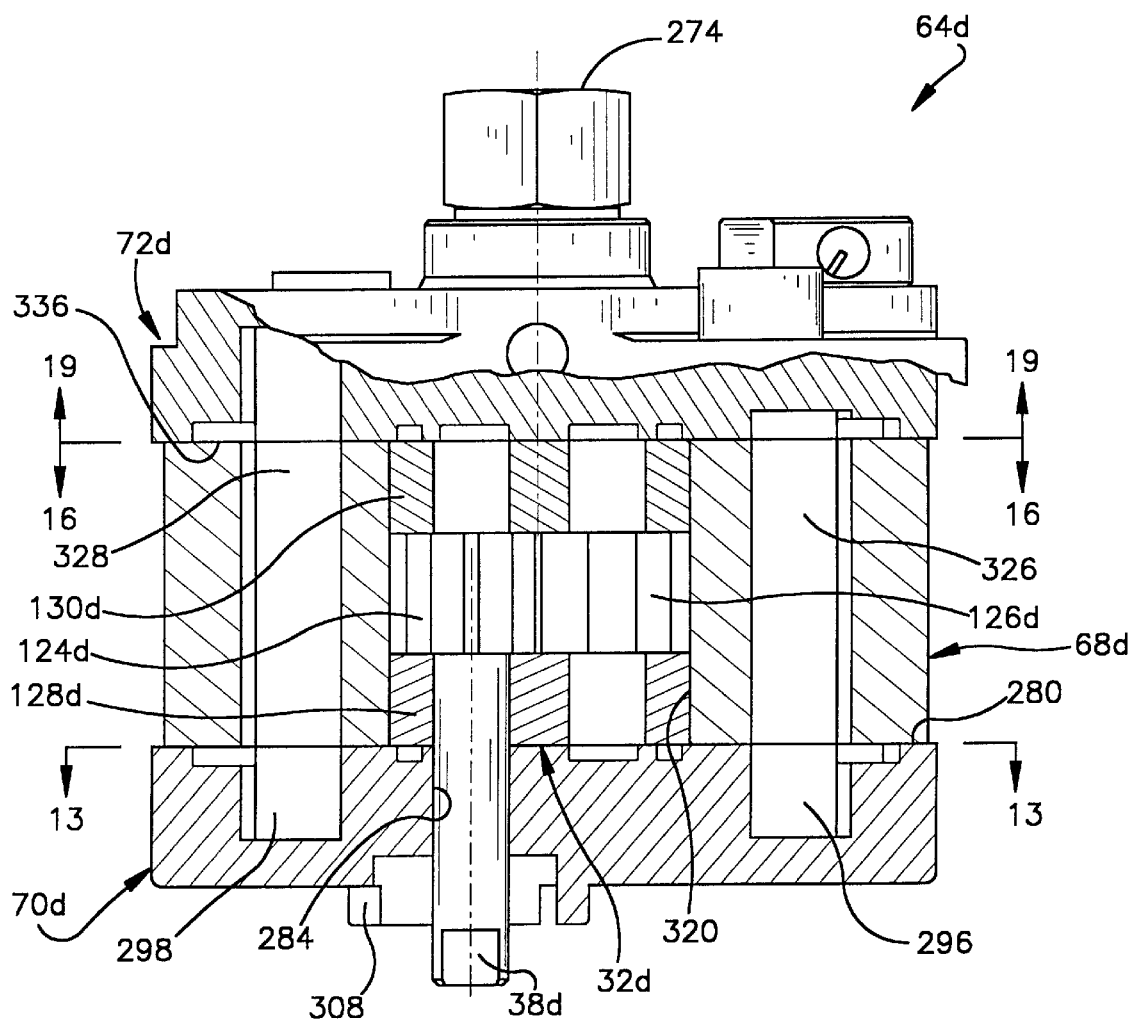
FIG. 12 is a simplified sectional view of the pump assembly of FIG. 9.

The pump unit 32d (FIG. 5) includes a gear 124d which is fixedly connected with the input shaft 38d. The gear 124d is disposed in meshing engagement with a second gear 126d (FIG. 12). A pair of bearing plates 128d and 130d (FIG. 5) are disposed adjacent to opposite axial ends of the gears in the pump unit 32d.

During operation of the electric motor 34d, the motor output shaft 40d, pump input shaft 38d and gear 124d are rotated about their coincident central axes. Rotation of the gears 124d and 126d is effective to induce a flow of hydraulic fluid from the reservoir 52d into the pump unit 32d. Fluid discharged from the pump unit is conducted through an outlet conduit 210 (FIG. 5) to a power steering control valve (not shown). The fluid pressure is utilized to actuate a power steering motor in a known manner. Of course, the fluid pressure provided by operation of the pump unit 32d could be used for purposes other than actuating a power steering motor.

The electric motor 34d (FIG. 5) includes a stator 100d having windings 102d which are fixedly connected to a cylindrical tubular stem 108d. In the illustrated embodiment of the invention, the stem 108d is integrally formed with the manifold plate 44d as one piece of metal. However, it is contemplated that the stem 108d could be formed separately from the manifold plate 44d and fixedly connected with the manifold plate.

A cylindrical rotor 112d extends around and encloses the stator 100d. The rotor 112d includes a housing 212 having a cylindrical side wall 214 and a circular end wall 216. The end wall 216 is fixedly connected with the motor output shaft 40d. Magnets 113d are fixedly connected to the side wall 214 of the housing 212. The magnets 113d are disposed in a cylindrical array which extends around and is spaced from the stator 100d.

The rotor 112d and motor output shaft 40d are rotatably supported by a pair of bearings 222 and 224. The bearings 222 and 224 rotatably support the motor output shaft 40d for rotation relative to the stator 100d about a central axis 228 of the tubular stem 108d and electric motor 34d. The bearing 224 is disposed in the circular opening 62d.

A seal 232 extends between the inside of the stem 108d and the motor output shaft 40d. The seal 232 blocks fluid flow through a cylindrical passage 234 in the tubular stem 108d. If desired, the seal 232 could be disposed adjacent to the bearing 222 and the end wall 216.

Figure 5:
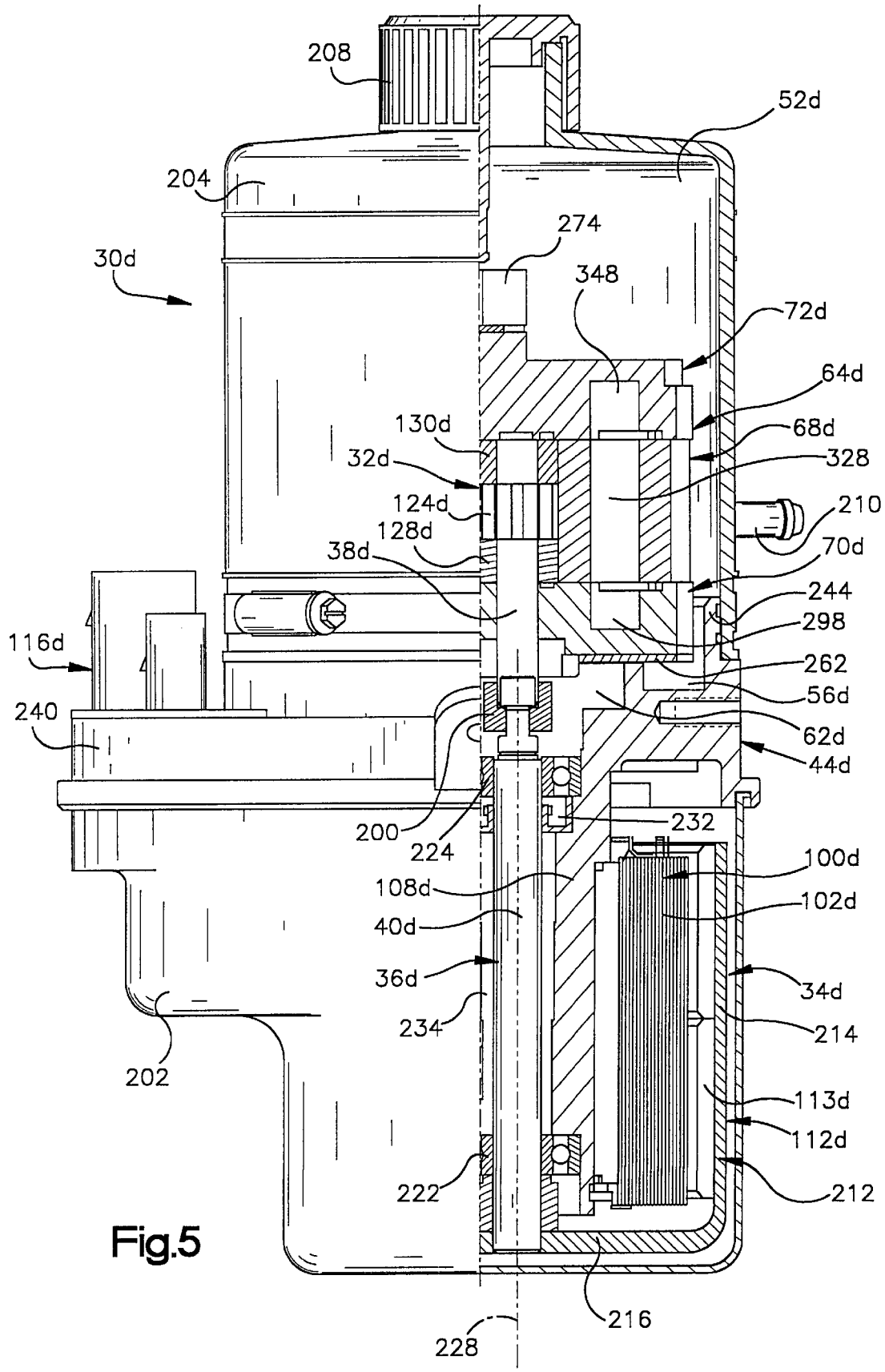
FIG. 5 is a partially broken away view illustrating one specific embodiment of the apparatus of FIG. 1.
Figure 6:
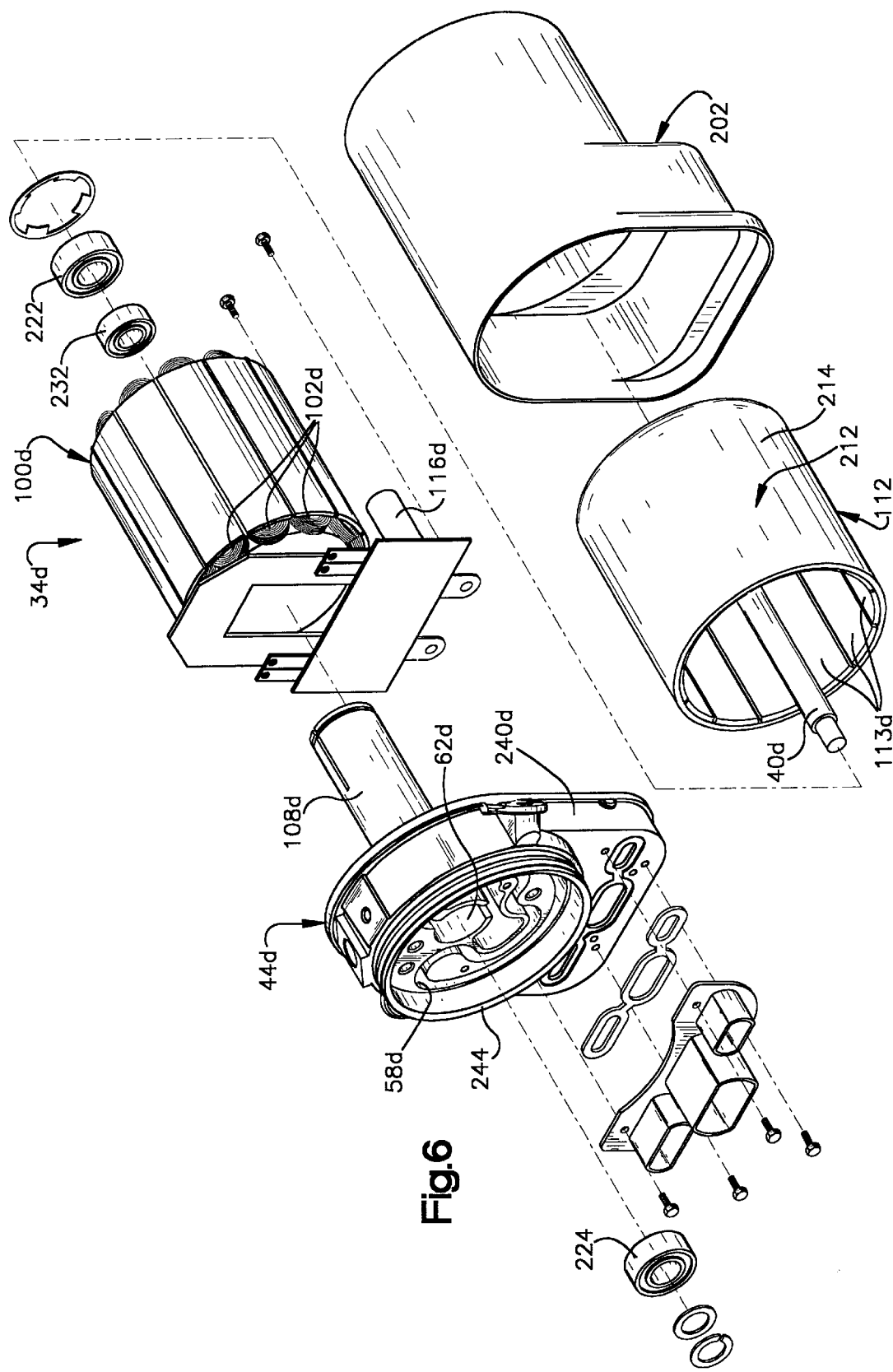
FIG. 6 is an exploded pictorial illustration depicting the relationship between a manifold plate and an electric motor in the apparatus of FIG. 5.
Figure 7:
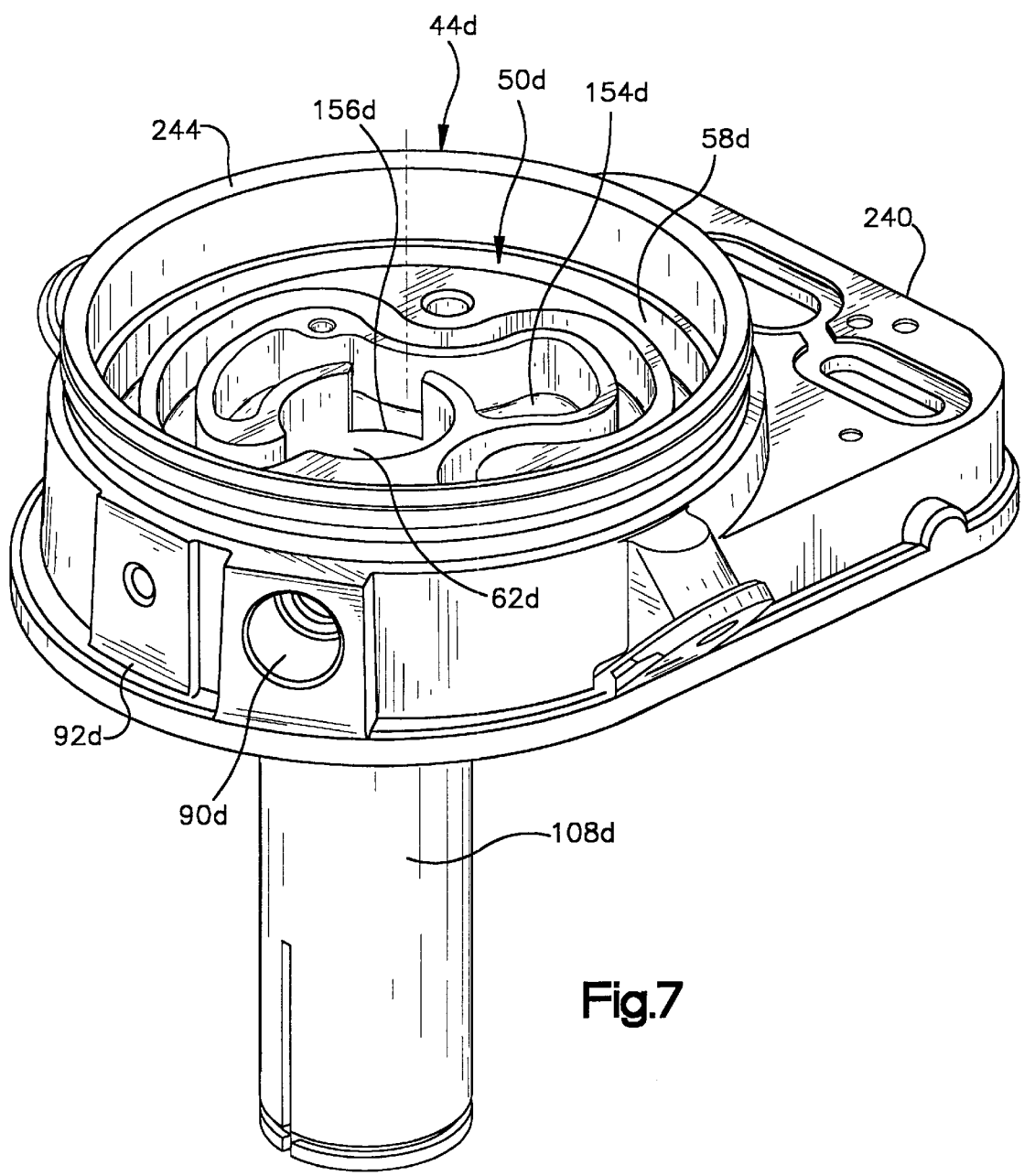
FIG. 7 is an enlarged pictorial illustration of the manifold plate of FIG. 6.

Motor control circuitry 116d (FIG. 6) is mounted on a flange 240 on the manifold plate 44d. The manifold plate 44d has a circular rim 244 (FIGS. 5, 6, 7 and 8) which is connected with the pump housing 204 (FIG. 5). The manifold plate 44d is integrally cast as one piece with the flange 240 and stem portion 108d (FIG. 7). However, if desired, the flange 240 and/or stem portion 108d could be formed separately from the manifold plate 44d and fixedly connected to the manifold plate.

The rigid metal manifold plate 44d has a construction which is similar to the construction of the manifold plate 44c of FIG. 4. Thus, the manifold plate 44d includes a hydraulic muffler 50d (FIG. 8) having an inlet 56d and an outlet 60d. A serpentine channel 58d extends between the inlet 56d and the outlet 60d. The outlet 60d is connected in fluid communication with an opening 62d which extends through the manifold plate 44d and is coaxial with and is connected in fluid communication with the passage 234 (FIG. 5) in the stem portion 108d.

A cavity 154d (FIG. 8) is formed in the manifold plate 44d. The cavity 154d holds a compliant element, not shown in FIGS. 7 and 8. However, the compliant element has a configuration corresponding to the configuration of the compliant element 152c in FIG. 4. The compliant element (not shown) in the cavity 154d is formed of foam rubber and is resiliently compressible.

The cavity 154d (FIG. 8) is connected in fluid communication with the opening 62d through a passage 156d. The entrance 156d to the cavity 154d is disposed diametrically opposite from the outlet 60d from the channel 58d. Therefore, during operation of the pump unit 32d a pressure pulse conducted from the inlet to the pump unit to the opening 62d can enter both the channel 58d and the cavity 154d. This reduces the magnitude of the pressure pulse which must be damped by the inertia of fluid flow through the channel 58d.

Although the manifold plate 44d has the same construction as the manifold plate 44c of FIG. 4, it is contemplated that the manifold plate 44d could have a different construction if desired. For example, the manifold plate 44d could have the same construction as the manifold plate 44b of FIG. 3 or the manifold plate 44a of FIG. 2. Although it is believed that it will be preferred to use one or more compliant elements in association with the manifold plate 44d (FIGS. 7 and 8), the compliant elements and associated cavities could be omitted if desired. This would result in the hydraulic muffler 50d having only the channel 58d to attenuate noise produced by the pump unit 32d.

Pump Assembly

It is contemplated that many different known pump assemblies will be adapted by those skilled in the art to function with any one of the manifold plates 44, 44a, 44b, 44c or 44d. One specific pump assembly 64d which may be utilized with the manifold plate 44d is illustrated in FIGS. 5 and 9 through 21. It should be understood that the pump assembly 64d could have a construction which is different than the specific construction described herein and illustrated in FIGS. 5 and 9 through 21.

Figure 8:
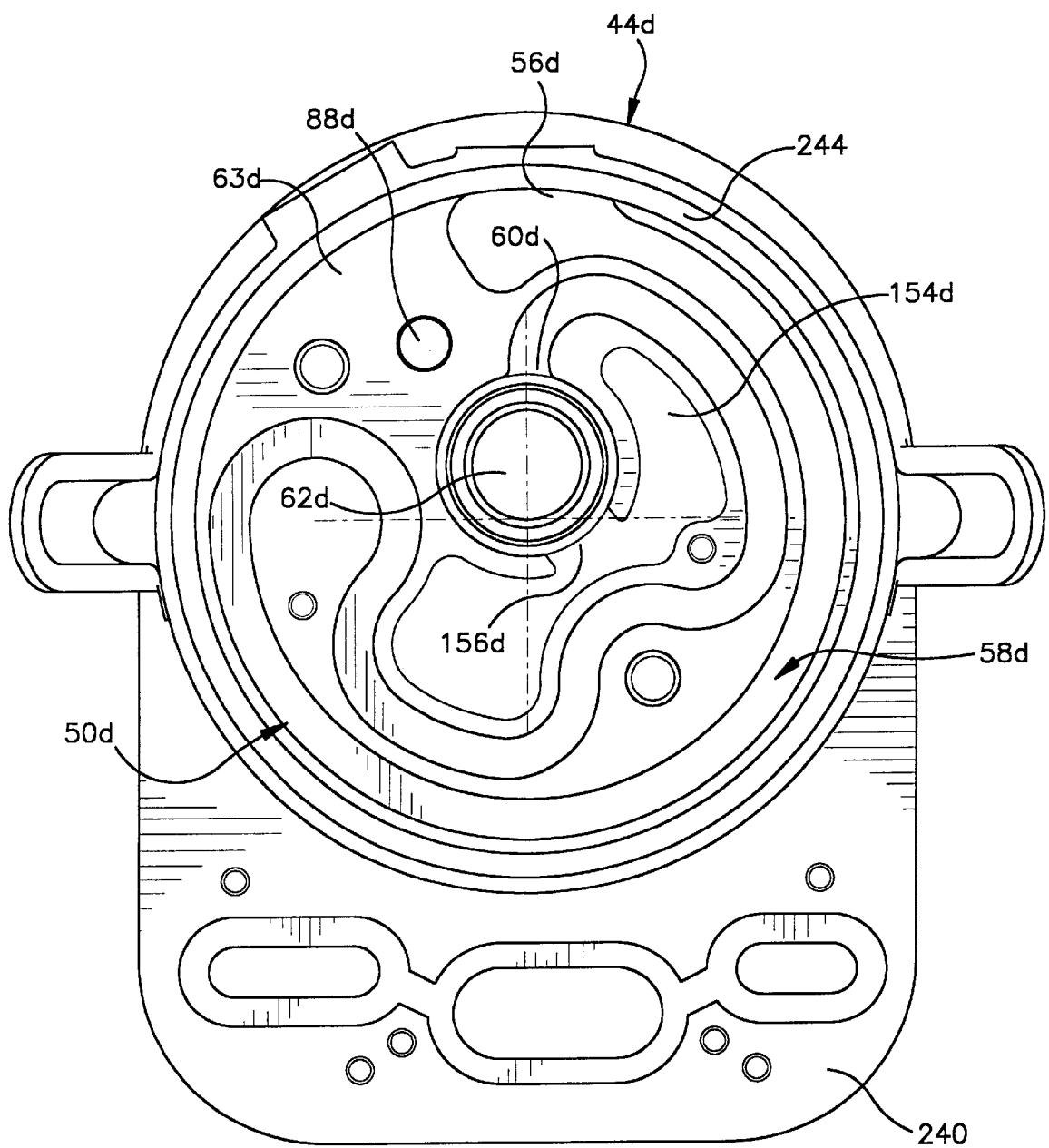
FIG. 8 is a top plan view of the manifold plate of FIG. 7.

The pump assembly 64d (FIG. 9) includes a rigid metal mounting plate 262 which engages the manifold plate 44d (FIGS. 5, 7 and 8). The mounting plate 262 (FIG. 10) has a circular opening 264 which is aligned with the opening 62d in the manifold plate 44d. When the opening 264 is aligned with the opening 62d, an indentation or notch 266 (FIG. 10) in the mounting plate 262 is aligned with the inlet end 56d (FIG. 8) of the hydraulic muffler 50d. This enables hydraulic fluid to flow from the reservoir 52d (FIG. 5) into the channel 58d (FIG. 8) in the manifold plate 44d.

When the mounting plate 262 (FIGS. 9 and 10) is positioned in engagement with the manifold plate 44d (FIG. 8), an outlet opening 270 (FIG. 10) through the mounting plate 262 is aligned with an outlet passage 88d (FIG. 8) in the manifold plate 44d. The outlet passage 88d in the manifold plate 44d is connected with an outlet opening 90d (FIG. 7) formed in a side 92d of the manifold plate 44d.

In addition to the mounting plate 262 (FIG. 9), the pump assembly 260 includes a rigid metal lower cover plate 70d (FIGS. 12, 13, 14 and 15) which is disposed in abutting engagement with the mounting plate 262. If desired, the lower cover plate 70d could have the same configuration as the mounting plate 262 and be disposed in abutting engagement with the manifold plate 44d. Alternatively, the mounting plate 262 could be integrally formed as one piece with the lower cover plate 70d.

Figure 9:
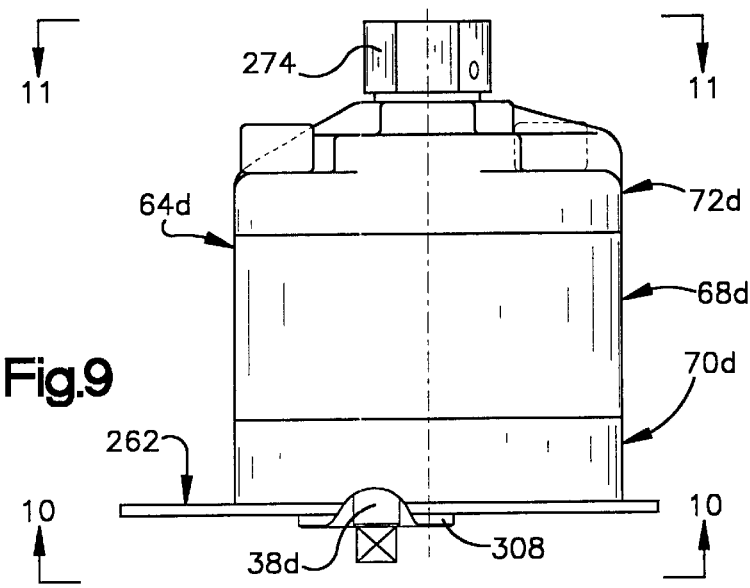
FIG. 9 is a side elevational view of one pump assembly which may be used with the manifold plate of FIGS. 7 and 8.
Figure 10:
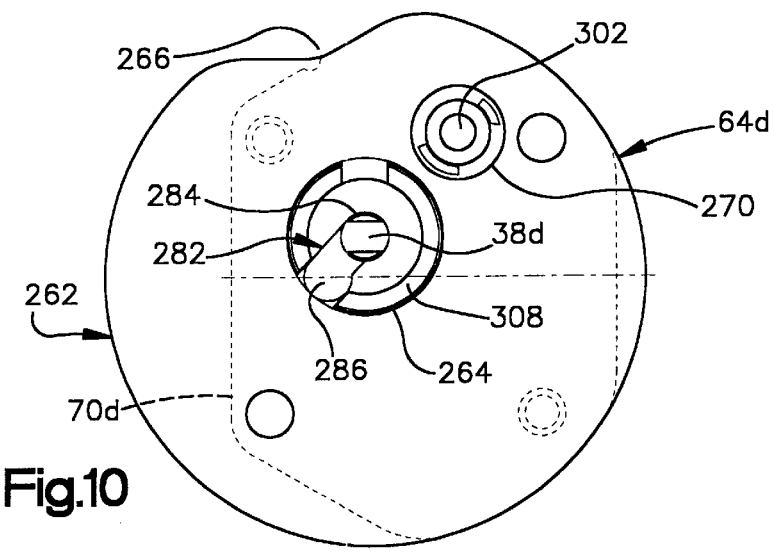
FIG. 10 is a bottom plan view, taken generally along the line 10—10 of FIG. 9.
Figure 11:
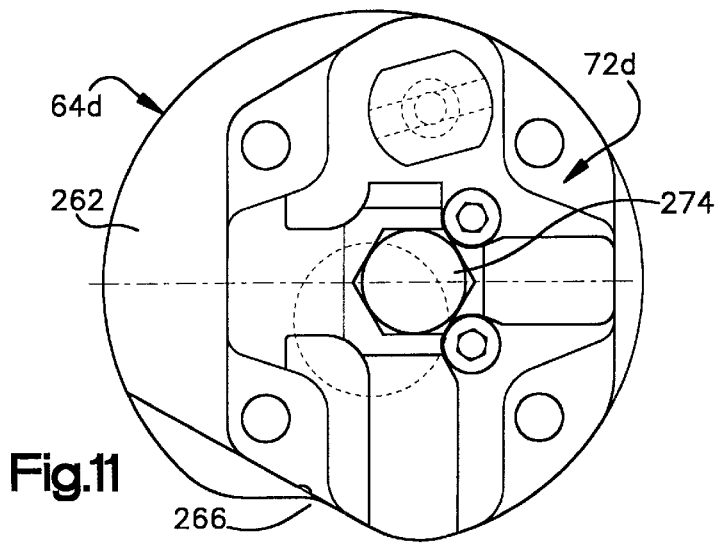
FIG. 11 is a top plan view, taken generally along the line 11—11 of FIG. 9.

A rigid metal body section 68d (FIGS. 9, 12, 16, 17 and 18) is disposed in abutting engagement with the lower cover plate 70d. A rigid metal upper cover plate 72d (FIGS. 9, 11, 12, 19, 20 and 21) is disposed in engagement with the body section 68d. A Wagner (trademark) pressure relief valve 274 is mounted on the upper cover plate 72d (FIGS. 9, 11 and 12).

A pump unit 32d (FIG. 12) is disposed in the body section 68d. The pump unit 32d includes a lower (as viewed in FIG. 12) bearing plate 128d and an upper bearing plate 130d. A pair of gears 124d and 126d are disposed between the bearing plates 128d and 130d. The gears 124d and 126d are disposed in meshing engagement and are rotatable in opposite directions to pump hydraulic fluid in a known manner. The mounting plate 262, lower cover plate 70d, body section 68d and upper cover plate 72d are connected with the manifold plate 44d (FIG. 5) by suitable fasteners.

Lower Cover Plate

The lower cover plate 70d (FIGS. 13, 14 and 15) includes an inner side 280 (FIG. 13) which is disposed in abutting engagement with the body section 68d (FIG. 12). The lower cover plate 70d (FIGS. 13 and 15) has an oblong opening 282. The opening 282 corresponds to the inlet opening 76 of FIG. 1. The opening 282 has an end portion 284 through which the input shaft 38d (FIG. 10) to the pump unit 32d (FIG. 12) extends.

The opening 282 has an inlet end portion 286 (FIG. 13) through which fluid flows from the opening 62d (FIG. 8) in the manifold plate 44d to the pump unit 32d (FIG. 12). The flow of hydraulic fluid fills all of the opening 282 which is not blocked by the input shaft 38d (FIGS. 10 and 12) for the pump unit 32d (FIG. 12). Therefore, the hydraulic fluid conducted to the inlet of the pump unit 32d flows along the outside of the input shaft 38d and through the lower cover plate 70d to the pump unit 32d.

Figure 13:
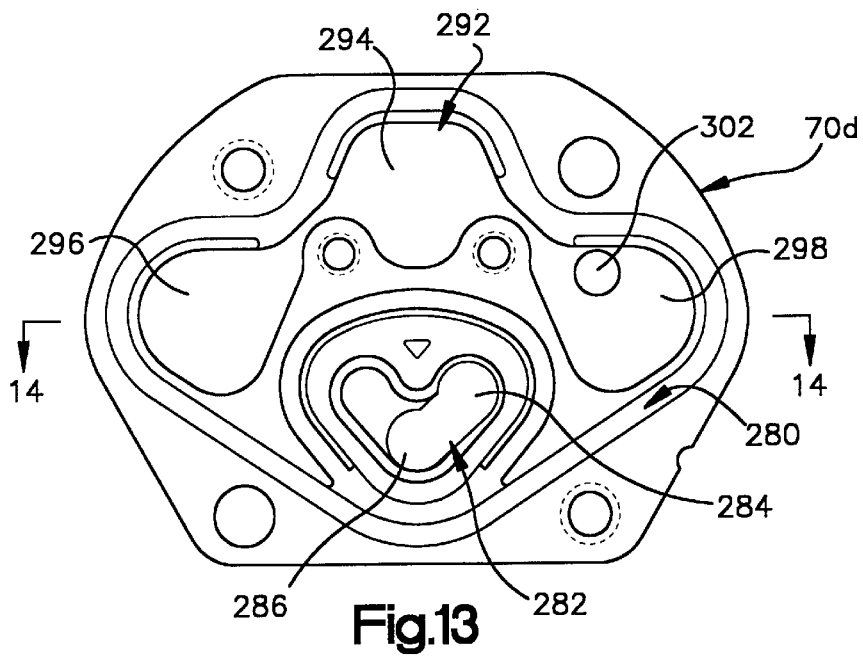
FIG. 13 is a plan view, taken generally along the line 13—13 of FIG. 12, of a lower cover plate of the pump assembly.
Figure 14:
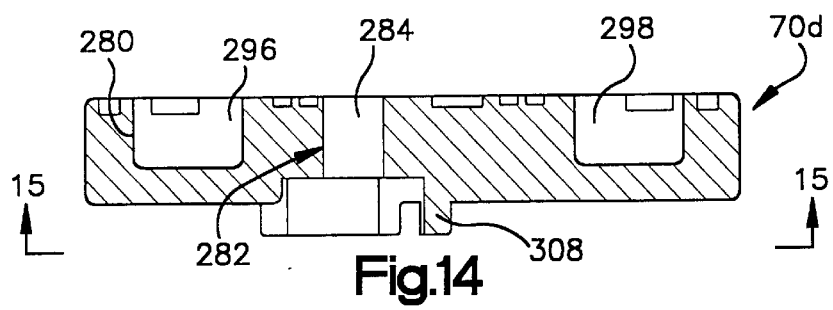
FIG. 14 is a sectional view, taken generally along the line 14—14 of FIG. 13, of the lower cover plate.
Figure 15:
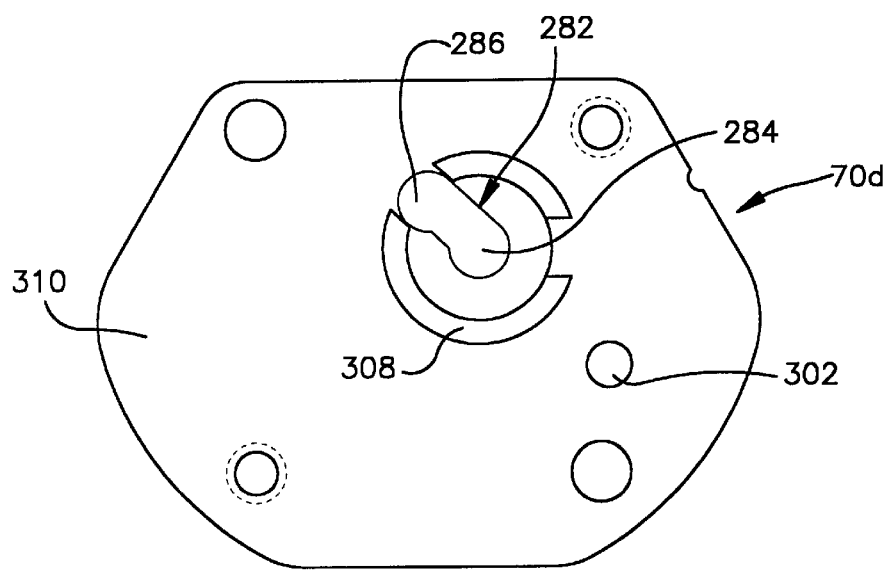
FIG. 15 is a plan view, taken generally along the line 15—15 of FIG. 14 further illustrating the lower cover plate.

An outlet cavity 292 (FIG. 13) is formed in the lower cover plate 70d. The outlet cavity 292 includes a central section 294 and a pair of side sections 296 and 298 (FIGS. 13 and 14). Since the outlet cavity 292 contains high pressure fluid conducted from the pump unit 32 and the inlet opening 282 contains relatively low pressure fluid, suitable seals are provided between the outlet cavity 292 and the opening 282 through which the inlet fluid is conducted.

An outlet opening 302 (FIGS. 13 and 15) is formed in the side section of the outlet cavity 298. The outlet opening 302 is aligned with the outlet opening 270 (FIG. 10) in the mounting plate 262. The outlet opening 270 in the mounting plate 262 and the outlet opening 302 in the lower cover plate 70d are aligned with the outlet opening 88d (FIG. 8) in the manifold plate 44d. As was previously mentioned, the outlet opening 88d is connected with a suitable conduit which conducts the high-pressure fluid from the pump unit 32d to a location where the fluid is utilized.

A circular collar 308 extends downward (as viewed in FIG. 14) from an outer side 310 (FIGS. 14 and 15) of the lower cover plate 70d. The collar 308 extends around the opening 282. The collar 308 extends through the mounting plate 262 (FIG. 9) into the opening 62d (FIG. 8) in the manifold plate 44d.

Body Section

The rigid metal body section 68d (FIGS. 16, 17 and 18) is disposed between the lower cover plate 70d and upper cover plate 72d (FIG. 12). The body section 68d (FIGS. 16–18) is integrally cast as one piece of metal and includes a central opening 320 in which the pump unit 32d (FIG. 12) is disposed. The central opening 320 is connected in fluid communication with the inlet end portion 286 (FIG. 13) of the opening 282 in the lower cover plate 70d.

The body section 68d includes a plurality of resonator passages 82d (FIG. 16) which extend axially through the body section 68d. The resonator passages 82d include a central passage 324 which is aligned with the central section 294 of the outlet cavity 292 (FIG. 13) in the lower cover plate 70d. In addition, the resonator passages 82d include side passages 326 and 328 (FIGS. 16–18) which are aligned with the side sections 296 and 298 of the outlet cavity 292 in the lower cover plate 70*d* (FIG. 13). Suitable seals are provided between the central opening 320 and the resonator passages 82*d* to prevent leakage between the central opening 320 and the resonator passages.

Upper Cover Plate

The rigid metal upper cover plate 72*d* (FIGS. 9, 11, 12, 19, 20 and 21) is disposed in abutting engagement with the body section 68*d* (FIG. 12). The upper cover plate 72*d* includes an inner side 336 (FIG. 19) which engages the body section 68*d* (FIG. 12). The inner side 336 (FIG. 19) of the upper cover plate 72*d* has a recess 340 which is connected in fluid communication with the outlet from the pump unit 32*d*.

Figure 16:
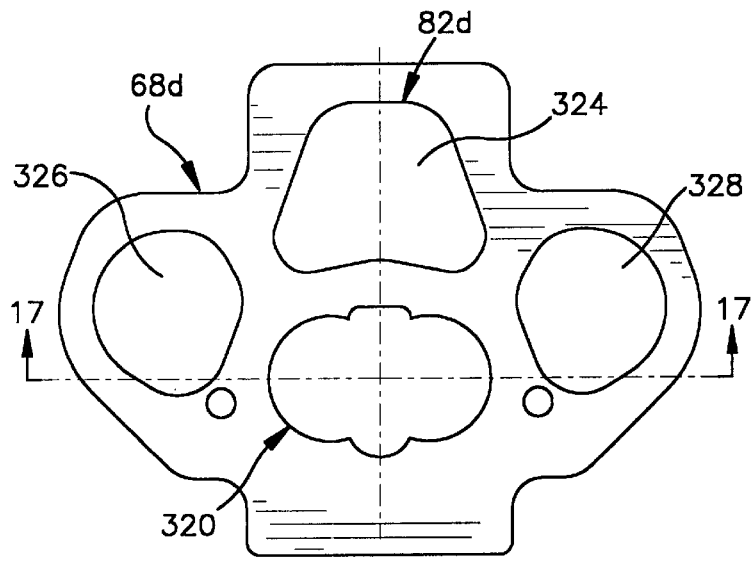
FIG. 16 is a plan view, taken generally along the line 16—16 of FIG. 12, of body section of the pump assembly.
Figure 17:
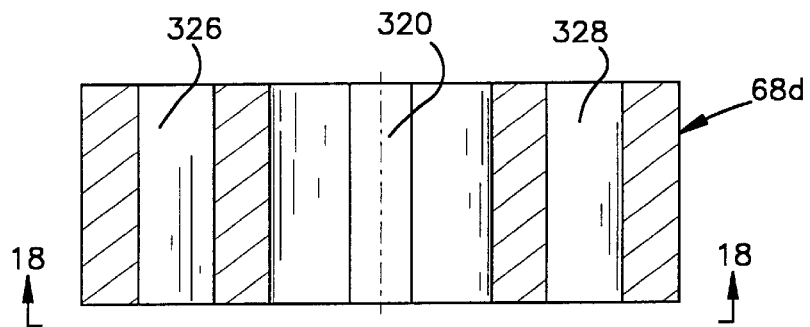
FIG. 17 is a sectional view, taken generally along the line 17—17 of FIG. 16 of the body section.
Figure 18:
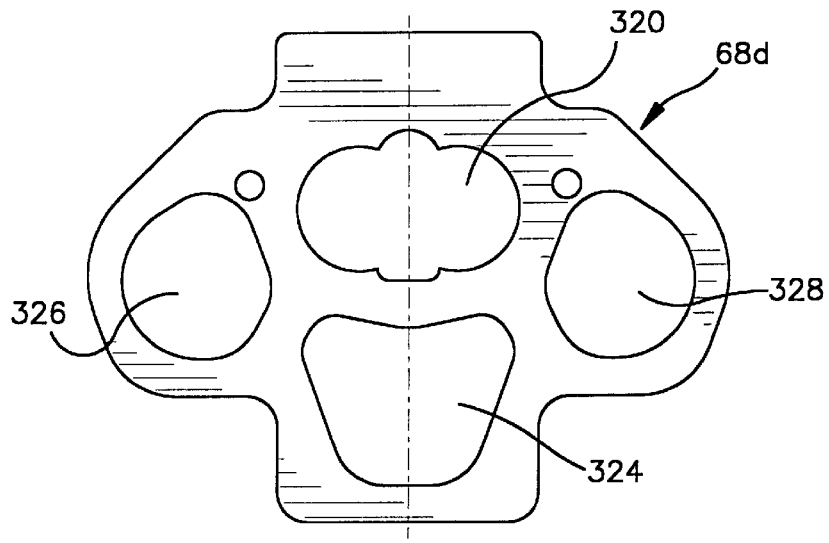
FIG. 18 is a plan view, taken generally along the line 18—18 of FIG. 17 further illustrating the body section.
Figure 19:
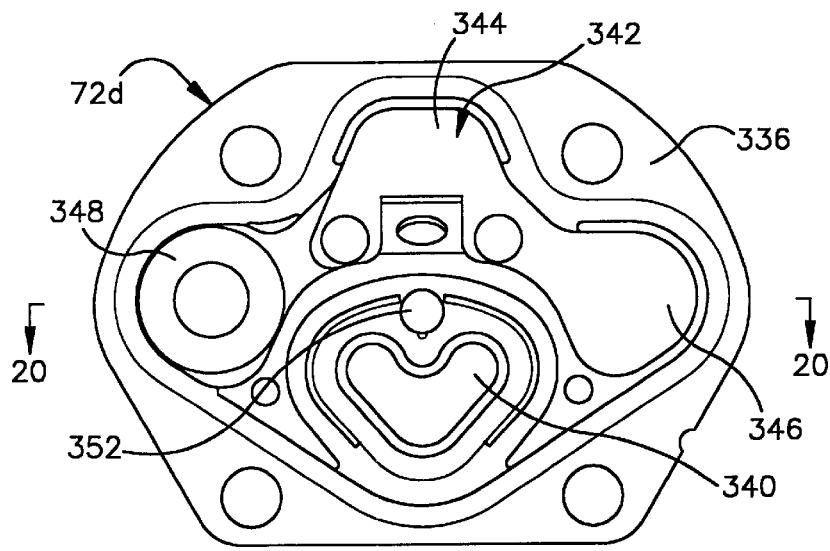
FIG. 19 is a plan view, taken generally along the line 19—19 of FIG. 12, of an upper cover plate of the pump assembly.
Figure 20:
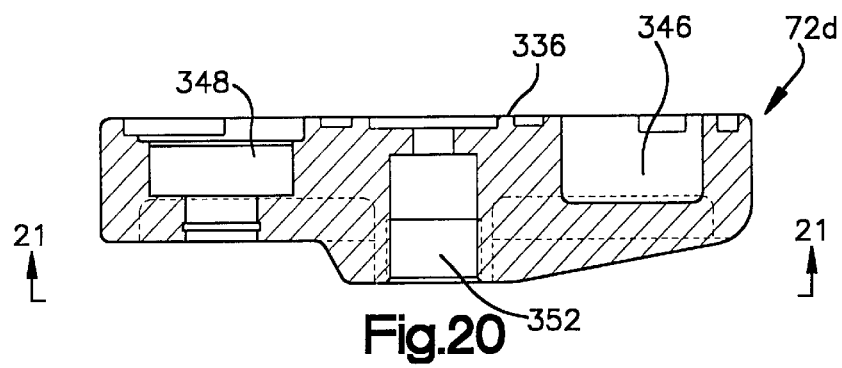
FIG. 20 is a sectional view, taken generally along the line 20—20 of FIG. 19 of the cover plate.
Figure 21:
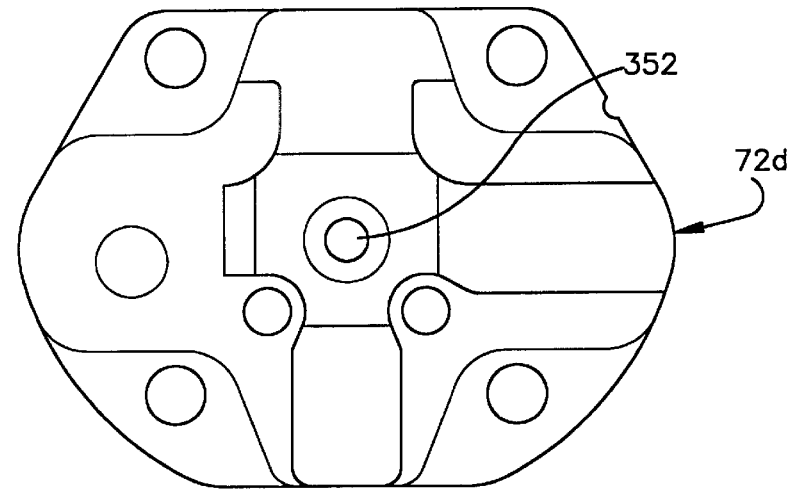
FIG. 21 is a plan view, taken generally along the line 21—21 of FIG. 20 further illustrating the cover plate.

The recess 340 (FIG. 19) is connected in fluid communication with an outlet cavity 342 formed in the upper cover plate 72*d*. The outlet cavity 342 has a central portion 344 which is aligned with the central passage 324 (FIG. 16) in the body section 68*d*. In addition, the outlet cavity 342 (FIG. 19) includes a side section 346 which is aligned with the side passage 326 (FIG. 16) in the body section 68*d*. The outlet cavity 342 (FIG. 19) includes a side section 348 which is aligned with the side passage 328 in the body section 68*d* (FIGS. 16, 19 and 20). The pressure relieve valve 274 (FIG. 9) is connected with an opening 352 (FIGS. 20 and 21) formed in the upper cover plate 72*d*.

Alternative Embodiment of Apparatus

Figure 22:
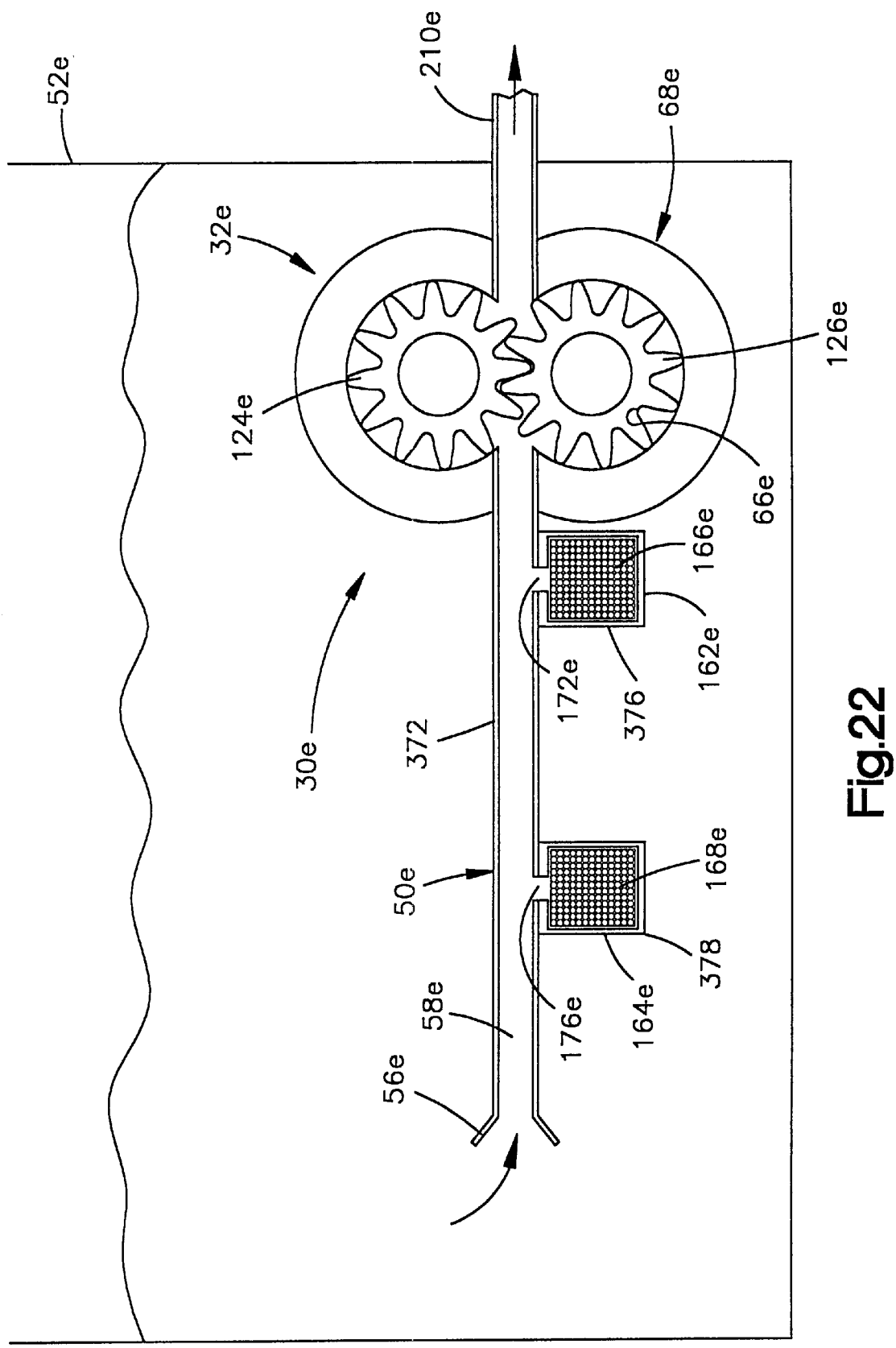
FIG. 22 is a schematic illustration of another embodiment of the invention.

In the embodiments of the invention illustrated in FIGS. 1 through 21, the apparatus which pumps hydraulic fluid includes a hydraulic muffler 50 which is disposed between a manifold plate 44 and a lower cover plate 70. In the embodiment of the invention illustrated in FIG. 22, the hydraulic muffler includes a plurality of cavities which are disposed along a conduit connected with an inlet to a pump unit. Since the embodiment of the invention illustrated in FIG. 22 is generally similar to the embodiments of the invention illustrated in FIGS. 1–21, similar numerals will be utilized to designate similar components, the suffix letter "e" being associated with the numerals of FIG. 22 to avoid confusion.

An apparatus 30*e* (FIG. 22) includes a pump unit 32*e*. The pump unit 32*e* is driven by an electric motor, not shown, corresponding to the electric motor 34. A drive shaft, not shown, corresponding to the drive shaft 36, transmits rotational force (torque) from the electric motor to the pump unit 32*e*. The apparatus 30*e* is disposed in a reservoir 52*e* containing hydraulic fluid.

During operation of the pump unit 32*e*, a flow of hydraulic fluid is conducted from the reservoir 52*e* through an outlet conduit 210*e* to a power steering control valve (not shown). Fluid is conducted to the pump unit 32*e* from the reservoir 52*e* through a hydraulic muffler 50*e*. The fluid from the hydraulic muffler 50*e* flows through an inlet to the pump unit 32*e* to an outlet from the pump unit. A pair of meshing gears 124*e* and 126*e* are disposed in a pump chamber 66*e* formed in a body section 68*e* of the pump unit 32*e*.

During operation of the pump unit 32*e* (FIG. 22), hydraulic fluid pressure fluctuations created by the pump unit result in the generation of noise. To attenuate the noise, the hydraulic muffler 50*e* is provided between an inlet to the pump unit 32*e* and a reservoir 52*e* which holds hydraulic fluid. Hydraulic fluid in the reservoir 52*e* is exposed to an inlet end 56*e* of the hydraulic muffler 50*e*.

In the embodiment of the invention illustrated in FIG. 22, the hydraulic muffler 50*e* includes a linear conduit 372 which defines a channel 58*e* through which hydraulic fluid is conducted to the pump unit 32*e*. The conduit 372 is formed by a rigid metal tube. However, the conduit 372 could be formed of a polymeric material if desired. In the illustrated embodiment of the invention, the conduit 372 and the channel 58*e* have a linear configuration. However, if desired, the conduit 372 and channel 58*e* could have a serpentine configuration similar to the configuration of any one of the channels illustrated in FIGS. 1, 2, 3 or 4.

In accordance with another feature of this embodiment of the invention, a plurality of cavities are provided to hold a plurality of compliant elements to minimize variations in the fluid pressure in the channel 58*e* (FIG. 22). Thus, cavities 162*e* and 164*e* are connected in fluid communication with the channel 58*e* through passages 172*e* and 176*e*. Although a single passage 172*e* is provided in association with the cavity 162*e* and a single passage 176*e* is provided in association with the cavity 164*e*, either one or both of the cavities 162*e* and 164*e* may be connected with the channel 58*e* by a plurality of passages.

A compliant element 166*e* is disposed in the cavity 162*e*. A second compliant element 168*e* is disposed in the cavity 164*e*. The complaint elements 166*e* and 168*e* are formed of a resiliently compressible material.

Although the compliant elements 166*e* and 168*e* and the cavities 162*e* and 164*e* could have many different configurations, it is preferred to form them with rectangular configurations. The rectangular configurations of the compliant elements 166*e* and 168*e* facilitates forming the compliant elements from extruded or cut foam rubber. The rectangular configuration of the cavities 162*e* and 164*e* facilitates the formation of rectangular housings 376 and 378 which are connected with the conduit 372.

During operation of the pump unit 32*e*, the meshing teeth of the gears 124*e* and 126*e* cause fluctuations in the hydraulic fluid conducted to the inlet to the pump unit. These fluctuations result in pressure pulses in the flow of fluid to the inlet to the pump unit 32*e*. The propagation of the fluid pressure pulses is resisted by the combined effect of inertia of fluid flowing through the channel 58*e* and the compliant elements 166*e* and 168*e*.

Upon an increase in the fluid pressure conducted from the inlet to the pump chamber 66*e* to the channel 58*e*, the compliant element 166*e* is resiliently deflected to compress the compliant element. This increases the volume of the cavity 162*e* which is not occupied by the compliant element 166*e*. As the compliant element 166*e* is compressed, hydraulic fluid flows into the cavity 162*e* to attenuate the increase in fluid pressure in the channel 58*e*. Similarly, upon an increase in the fluid pressure in the channel 58*e*, the compliant element 168*e* is resiliently deflected to compress the compliant element. This increases the volume of the cavity 164*e* which is not occupied by the compliant element 168*e*. As the complaint element 168*e* is compressed, hydraulic fluid flows into the cavity 164*e* to attenuate the increase in fluid pressure in the channel 58*e*.

The combination of the compliant elements 166*e* and 168*e* and the channel 58*e* enables the hydraulic muffler 50*e* to attenuate noise resulting from the operation of the pump unit 32*e*. Thus, the flow of fluid through the channel 58*e* provides inertia which reduces the amount of back pressure transmitted through the channel. The resilient deflection of the compliant elements 166*e* and 168*e* results in the volume of fluid in the cavities 162*e* and 164*e* increasing to absorb fluid pressure waves in the flow of fluid in the channel 50*e*. Of course, when a fluid pressure pulse in the channel 58*e* has passed, the compliant elements 166*e* and 168*e* expand and fluid is discharged from the cavities 162*e* and 164*e* into the flow of fluid in the channel 58e. The compliant elements 166e and 168e dampen fluid pressure pulses and tend to maintain a constant rate of flow of hydraulic fluid in the channel 58e by enabling hydraulic fluid to flow into and out of the cavities 162e and 164e.

In the embodiment of the invention illustrated in FIG. 22, the compliant elements 166e and 168e are formed of a resiliently compressible material, such as foam rubber. However, it is contemplated that the compliant elements 166e and 168e could be formed in a different manner if desired. For example, a resiliently deflectable diaphragm could be provided each of the cavities 162e and 164e to form the compliant elements.

From the above description of the invention, those skilled in the art will perceive improvements, changes and modifications. Such improvements, changes and modifications within the skill of the art are intended to be covered by the appended claims.

Having described the invention, the following is claimed:

1. An apparatus comprising:
   a gear pump unit having an inlet and an outlet, said gear pump unit includes a plurality of rotatable gears which are disposed in meshing engagement and are rotatable relative to each other to induce a flow of hydraulic fluid through said gear pump unit from said inlet to said outlet;
   a plate member connected to said gear pump unit;
   a tubular stem extending from said plate member in a direction away from said gear pump unit;
   an electric motor connected with said plate member, said electric motor includes a stator which extends around and is fixedly connected to said tubular stem in a coaxial relationship with said tubular stem, and a rotor which extends around said stator and is rotatable about an axis which is coincident with a central axis of said tubular stem and said stator; and
   a drive shaft which is fixedly connected with said rotor and is disposed in a coaxial relationship with and extends through said tubular stem, said drive shaft being connected with one of said gears in said gear pump unit, said drive shaft and said one gear in said gear pump unit being rotatable together about the central axis of said tubular stem.

2. An apparatus as set forth in claim 1 further including means connected in fluid communication with said inlet to said gear pump unit for attenuating noise produced by said gear pump unit.

3. An apparatus as set forth in claim 2 wherein said means for attenuating noise is connected in fluid communication with the inlet to said gear pump unit through an opening in said plate member through which said drive shaft extends.

4. An apparatus as set forth in claim 2 wherein said means for attenuating noise includes a conduit which is at least partially formed by said plate member and which is connected in fluid communication with the inlet to said gear pump unit.

5. An apparatus as set forth in claim 2 wherein said means for attenuating noise includes a cavity which is at least partially defined by said plate member and a compliant element exposed to fluid pressure in said cavity.

6. An apparatus for use in pumping fluid, said apparatus comprising:
   a first plate member having first and second sides;
   a second plate member having first and second sides, said first side of said first plate member being disposed in engagement with said first side of said second plate member;
   a pump unit connected with and disposed adjacent to said second side of said first plate member and having a fluid inlet;
   a motor stator connected with and disposed adjacent to said second side of said second plate member, at least a portion of said first plate member and at least a portion of said second plate member being disposed between said pump unit and said motor stator;
   a motor rotor disposed adjacent to said motor stator and rotatable relative to said motor stator under the influence of magnetic force transmitted between said motor rotor and said motor stator;
   a drive shaft connected with said motor rotor and said pump unit to transmit force from said motor rotor to said pump unit during rotation of said motor rotor relative to said motor stator, said drive shaft extends through openings in said first sides of said first and second plate members; and
   a nonlinear channel disposed between said first sides of said first and second plate members to attenuate noise during operation of said pump unit, said channel having a first portion which is connected with a source of fluid, a second portion which is connected in fluid communication with the fluid inlet to said pump unit, and a nonlinear portion which extends between said first and second portions of said channel.

7. An apparatus as set forth in claim 6 further including a cavity disposed between said first sides of said first and second plate members, said cavity being connected in fluid communication with said channel to enable fluid pressure to be transmitted between said cavity and said channel during operation of said pump unit.

8. An apparatus as set forth in claim 6 wherein said pump unit is a gear pump having a plurality of gears disposed in meshing engagement, one of said gears of said plurality of gears being rotatable about an axis which extends through said first and second plate members.

9. An apparatus as set forth in claim 8 wherein said one gear of said plurality of gears and said driveshaft are rotatable about coincident axes.

10. An apparatus as set forth in claim 6 further including a tubular stem extending from said second plate member into said stator, said drive shaft being at least partially enclosed by said tubular stem, said stator being connected to and at least partially enclosing said tubular stem.

11. An apparatus as set forth in claim 10 wherein said rotor extends around and at least partially encloses said stator and said tubular stem.

12. An apparatus as set forth in claim 6 wherein said first and second plate members at least partially define a cavity which contains resilient material and is connected in fluid communication with said channel to enable said resilient material in said cavity to be compressed under the influence of fluid pressure.

13. An apparatus as set forth in claim 6 wherein said first and second plate members at least partially define a first cavity which is connected with said channel at a first location and a second cavity which is spaced from said first cavity and is connected with said channel at a second location spaced from said first location.

14. An apparatus as set forth in claim 13 further including a first compliant element exposed to fluid pressure in said first cavity and a second compliant element exposed to fluid pressure in said second cavity, said first and second compliant elements being deflectable under the influence of fluid pressure.

15. An apparatus as set forth in claim 6 wherein said second portion of said channel has an outlet which is disposed along first portions of the openings in said first sides of said first and second plate members through which said drive shaft extends, said first and second plate members at least partially define a cavity, said cavity having an inlet which is disposed along a second portion of the openings in said first sides of said first and second plate members through which said drive shaft extends.

16. An apparatus as set forth in claim 15 further including a compliant element exposed to fluid pressure in said cavity, said compliant element being deflectable under the influence of fluid pressure conducted from said opening into said cavity.

17. An apparatus as set forth in claim 6 wherein said channel extends at least part way around central portions of said first sides of said first and second plate members, said central portion of said first and second sides of said first and second plate members at least partially define a cavity, said cavity being connected in fluid communication with said channel at a location between opposite ends of said channel, and a compliant element exposed to fluid pressure in said cavity.

18. An apparatus as set forth in claim 6 wherein said first and second plate members have circular configurations, said first portion of said channel having an inlet adjacent to a circular periphery of at least one of said plate members, said second portion of said channel having an outlet which is disposed in a central portion of said first and second plate members and is offset from a center of curvature of said circular periphery of said first and second plate members.

19. An apparatus as set forth in claim 6 further including a body member connected with said first plate member and disposed adjacent to said second side of said first plate member, and an upper cover connected with said body member and disposed adjacent to a side of said body member opposite from said first plate member, said pump unit being at least partially disposed in said body member.

20. An apparatus as set forth in claim 18 wherein hydraulic fluid is conducted from said second portion of said channel through said first plate member to said inlet to said pump unit and hydraulic fluid is conducted from said outlet from said pump unit through a plurality of passages in said body member and through said first plate member to a single outlet opening formed in said second plate member.

21. An apparatus for use in pumping fluid, said apparatus comprising:
 a reservoir adapted to hold hydraulic fluid,
 a pump unit having an inlet and an outlet, said pump unit is a gear pump having a plurality of gears disposed in meshing engagement,
 a plate member connected with said pump unit, said plate member having a channel formed in said plate member for attenuating noise, said channel having a first portion in fluid communication with said reservoir and a second portion in fluid communication with said inlet of said pump unit, one of said gears of said plurality of gears being rotatable about an axis which extends through said plate member, and
 an electric motor connected with said one gear of said plurality of gears, said electric motor having a stator which is fixedly connected with said plate member and a rotor which extends around said stator and encloses at least a portion of said stator, said electric motor having an output shaft which is rotatable with said rotor relative to said stator and extends through said stator, said output shaft being connected with said one gear of said plurality of gears.

22. An apparatus as set forth in claim 21 wherein said plate member at least partially defines a cavity connected in fluid communication with said channel to enable fluid pressure to be conducted from said channel to said cavity.

23. An apparatus as set forth in claim 21 wherein said plate member at least partially defines a first cavity which is connected with said channel at a first location and a second cavity which is spaced from said first cavity and is connected with said channel at a second location spaced from said first location.

24. An apparatus as set forth in claim 21 wherein said plate member has an opening through which said output shaft extends, said second portion of said channel has an outlet which is disposed along a first portion of said opening, said plate member at least partially defines a cavity, said cavity having an inlet which is disposed along a second portion of said opening, and a compliant element exposed to fluid pressure in said cavity, said compliant element being deflectable under the influence of fluid pressure conducted from said opening into said cavity.

25. An apparatus as set forth in claim 21 wherein said channel extends at least part way around a central portion of said plate member, said central portion of said plate member at least partially defines a cavity, said cavity being connected in fluid communication with said channel at a location between opposite ends of said channel.

26. An apparatus as set forth in claim 21 wherein said plate member has a circular configuration, said first portion of said channel having an inlet adjacent to a circular periphery of said plate member, said second portion of said channel having an outlet which is disposed in a central portion of said plate member and is offset from a center of curvature of said circular periphery of said plate member.

27. An apparatus as set forth in claim 21 further including a lower cover connected with said plate member and extending across said channel, a body member connected with said lower cover and disposed adjacent to a side of said lower cover opposite from said plate member, and an upper cover connected with said body member and disposed adjacent to a side of said body member opposite from said lower cover, said pump unit being at least partially disposed in said body member.

28. An apparatus as set forth in claim 27 wherein hydraulic fluid is conducted from said second portion of said channel through said lower cover to said inlet to said pump unit and hydraulic fluid is conducted from said outlet from said pump unit through a plurality of passages in said body member and through said lower cover to a single outlet opening formed in said plate member.

29. An apparatus as set forth in claim 21 wherein said one gear of said plurality of gears and said output shaft are rotatable about coincident axes.

30. An apparatus as set forth in claim 29 further including a tubular stem extending from said plate member into said stator, said output shaft being at least partially enclosed by said tubular stem, said stator being fixedly connected to and at least partially enclosing said tubular stem.

31. An apparatus for use in pumping fluid, said apparatus comprising:
 a reservoir adapted to hold hydraulic fluid;
 a pump unit having an inlet and an outlet; and
 a plate member connected with said pump unit, said plate member having a channel formed in said plate member for attenuating noise, said channel having a first portion in fluid communication with said reservoir and a second portion in fluid communication with said inlet of said pump unit, said plate member at least partially defines a cavity which contains resilient material and is connected in fluid communication with said channel to enable said resilient material in said cavity to be compressed under the influence of fluid pressure.

32. An apparatus as set forth in claim 31 wherein said pump unit is a gear pump having a plurality of gears disposed in meshing engagement, one of said gears of said plurality of gears being rotatable about an axis which extends through said plate member.

33. An apparatus as set forth in claim 31 further including an electric motor connected with said pump unit, said electric motor having a stator which is fixedly connected with said plate member and a rotor which extends around said stator and encloses at least a portion of said stator, said electric motor having an output shaft which is rotatable with said rotor relative to said stator and is connected with said pump unit.

34. An apparatus as set forth in claim 33 further including a tubular stem extending from said plate member into said stator, said output shaft being at least partially enclosed by said tubular stem, said stator being connected to said tubular stem.

35. An apparatus as set forth in claim 31 wherein said plate member at least partially defines a second cavity which contains resilient material and is connected in fluid communication with said channel to enable said resilient material in said second cavity to be compressed under the influence of fluid pressure.

36. An apparatus as set forth in claim 31 wherein said plate member has an opening through which a drive shaft for said pump unit extends, said second portion of said channel has an outlet which is disposed along a first portion of said opening, said cavity having an inlet which is disposed along a second portion of said opening, said resilient material being deflectable under the influence of fluid pressure conducted from said opening into said cavity.

37. An apparatus as set forth in claim 31 wherein said channel extends at least part way around a central portion of said plate member, said central portion of said plate member at least partially defines said cavity, said cavity being connected in fluid communication with said channel at a location between opposite ends of said channel.

38. An apparatus as set forth in claim 31 wherein said plate member has a circular configuration, said first portion of said channel having an inlet adjacent to a circular periphery of said plate member, said second portion of said channel having an outlet which is disposed in a central portion of said plate member and is offset from a center of curvature of said circular periphery of said plate member.

39. An apparatus as set forth in claim 31 further including a lower cover connected with said plate member and extending across said channel, a body member connected with said lower cover and disposed adjacent to a side of said lower cover opposite from said plate member, and an upper cover connected with said body member and disposed adjacent to a side of said body member opposite from said lower cover, said pump unit being at least partially disposed in said body member.

40. An apparatus as set forth in claim 39 wherein hydraulic fluid is conducted from said second portion of said channel through said lower cover to said inlet to said pump unit and hydraulic fluid is conducted from said outlet from said pump unit through a plurality of passages in said body member and through said lower cover to a single outlet opening formed in said plate member.

41. An apparatus as set forth in claim 31 wherein said cavity has an irregular configuration and said resilient material has an irregular configuration which corresponds to the irregular configuration of at least a portion of said cavity.

42. An apparatus as set forth in claim 41 wherein said resilient material includes a first main section, a second main section, and a connector section which extends between said first and second main sections, said connector section being smaller than said main sections of said resilient material.

43. An apparatus as set forth in claim 31 wherein said channel has a serpentine configuration, said cavity being connected in fluid communication with said channel at a location disposed between opposite ends of said channel.

44. An apparatus as set forth in claim 31 wherein said resilient material is formed of foam rubber.

45. An apparatus for use in pumping fluid, said apparatus comprising:

a reservoir adapted to hold hydraulic fluid;

a pump unit having an inlet and an outlet; and a plate member connected with said pump unit, said plate member having a channel formed in said plate member for attenuating noise, said channel having a first portion in fluid communication with said reservoir and a second portion in fluid communication with said inlet of said pump unit, said plate member has an opening through which a drive shaft for said pump unit extends, said second portion of said channel has an outlet which is disposed along a first portion of said opening, said plate member at least partially defines a cavity, said cavity having an inlet which is disposed along a second portion of said opening, and a compliant element exposed to fluid pressure in said cavity, said compliant element being deflectable under the influence of fluid pressure conducted from said opening into said cavity.

46. An apparatus as set forth in claim 45 wherein said pump unit is a gear pump having a plurality of gears disposed in meshing engagement, one of said gears of said plurality of gears being connected with said drive shaft for rotation therewith.

47. An apparatus as set forth in claim 45 further including an electric motor connected with said drive shaft said electric motor having a stator which is fixedly connected with said plate member and a rotor which extends around said stator and encloses at least a portion of said stator, said drive shaft being connected to and rotatable with said rotor.

48. An apparatus as set forth in claim 47 further including a tubular stem extending from said plate member into said stator, said drive shaft being at least partially enclosed by said tubular stem, said stator being connected to and at least partially enclosing said tubular stem.

49. An apparatus as set forth in claim 45 wherein said resilient material which is disposed in said cavity to enable said resilient material to be compressed under the influence of fluid pressure.

50. An apparatus as set forth in claim 45 wherein said plate member at least partially defines a second cavity which is connected with said channel, a second compliant element exposed to fluid pressure in said second cavity and deflectable under the influence of fluid pressure.

51. An apparatus for use in pumping fluid, said apparatus comprising:

a reservoir adapted to hold hydraulic fluid;

a pump unit having an inlet and an outlet;

a plate member connected with said pump unit, said plate member having a channel formed in said plate member for attenuating noise, said channel having a first portion in fluid communication with said reservoir and a second portion in fluid communication with said inlet of said pump unit;

a lower cover connected with said plate member and extending across said channel;

a body member connected with said lower cover and disposed adjacent to a side of said lower cover opposite from said plate member; and an upper cover connected with said body member and disposed adjacent to a side of said body member opposite from said lower cover, said pump unit being at least partially disposed in said body member, hydraulic fluid is conducted from said second portion of said channel through said lower cover to said inlet to said pump unit and hydraulic fluid is conducted from said outlet from said pump unit through a plurality of passages in said body member and through said lower cover to a single outlet opening formed in said plate member.

52. An apparatus as An apparatus as set forth in claim 51 wherein said pump unit is a gear pump having a plurality of gears disposed in meshing engagement, one of said gears of said plurality of gears being rotatable about an axis which extends through said plate member.

53. An apparatus as set forth in claim 52 further including an electric motor connected with said one gear of said plurality of gears, said electric motor having a stator which is connected with said plate member and a rotor which extends around said stator and encloses at least a portion of said stator, said electric motor having an output shaft which is rotatable with said rotor relative to said stator and is connected with said one gear of said plurality of gears.

54. An apparatus as set forth in claim 53 wherein said one gear of said plurality of gears and said output shaft are rotatable about coincident axes.

55. An apparatus as set forth in claim 53 further including a tubular stem extending from said plate member into said stator, said output shaft being at least partially enclosed by said tubular stem, said stator being connected to and at least partially enclosing said tubular stem.

56. An apparatus as set forth in claim 51 wherein said plate member at least partially defines a cavity which is connected in fluid communication with said channel.

57. An apparatus as set forth in claim 51 wherein said plate member at least partially defines a first cavity which is connected with said channel at a first location and a second cavity which is spaced from said first cavity and is connected with said channel at a second location spaced from said first location.

58. An apparatus as set forth in claim 51 wherein said plate member has an opening through which a drive shaft for said pump unit extends, said second portion of said channel has an outlet which is disposed along a first portion of said opening, said plate member at least partially defines a cavity, said cavity having an inlet which is disposed along a second portion of said opening.

59. An apparatus as set forth in claim 51 wherein said channel has a nonlinear configuration, said plate member at least partially defines a cavity, said cavity being connected in fluid communication with said channel at a location between opposite ends of said channel.

60. An apparatus as set forth in claim 51 wherein said plate member has a circular configuration, said first portion of said channel having an inlet adjacent to a circular periphery of said plate member, said second portion of said channel having an outlet which is disposed in a central portion of said plate member and is offset from a center of curvature of said circular periphery of said plate member.

61. An apparatus for use in pumping fluid, said apparatus comprising:

a reservoir adapted to hold hydraulic fluid;

a pump unit having an inlet and an outlet;

a plate member connected with said pump unit, said plate member having a channel formed in said plate member for attenuating noise, said channel having a first portion in fluid communication with said reservoir and a second portion in fluid communication with said inlet of said pump unit;

a drive shaft having a first end portion connected with one gear of a plurality of gears in said pump unit and extending through an opening in said plate member, said channel having an inlet adjacent to a peripheral portion of said plate member and an outlet adjacent to the opening in said plate member through which said drive shaft extends.

62. An apparatus as set forth in claim 61 wherein said first portion of said channel has a first center of curvature disposed in a central portion of said plate member and said second portion of said channel has a second center of curvature disposed in the central portion of said plate member.

63. An apparatus as set forth in claim 61 further including an electric motor connected with said drive shaft, said electric motor having a stator which is connected with said plate member and a rotor which extends around said stator and encloses at least a portion of said stator, said drive shaft being rotatable with said rotor relative to said stator and extends through said stator.

64. An apparatus as set forth in claim 63 wherein said one gear of said plurality of gears and said driveshaft are rotatable about coincident axes.

65. An apparatus as set forth in claim 61 further including a cavity having an irregular configuration connected in fluid communication with said channel.

66. An apparatus as set forth in claim 63 further including a tubular stem extending from said plate member, said drive shaft being at least partially enclosed by said tubular stem, said stator being connected to said tubular stem.

67. An apparatus as set forth in claim 61 wherein said plate member at least partially defines a cavity which contains is connected in fluid communication with said channel to enable fluid pressure to be conducted from said channel into said cavity.

68. An apparatus as set forth in claim 61 wherein said plate member at least partially defines a first cavity which is connected with said channel at a first location and a second cavity which is spaced from said first cavity and is connected with said channel at a second location spaced from said first location.

69. An apparatus as set forth in claim 61 wherein said first and second portions of said channel have curving central axes which extend parallel to said major side surface of said plate member.

70. An apparatus as set forth in claim 61 wherein said first and second portions of said channel have arcuately curving configurations, said first portion of said channel being disposed between said second portion of said channel and a periphery of said plate member.

71. An apparatus as set forth in claim 61 further including a tubular stem extending from said plate member in a direction away from said pump unit, a motor stator and connected with and extending around said tubular stem, a motor rotor extending around an outer periphery of said motor stator and rotatable relative to said motor stator, said drive shaft being connected with said motor rotor and said pump unit, at least a portion of said drive shaft is disposed in said tubular stem.

72. An apparatus as set forth in claim 61 wherein said plate member at least partially defines a cavity which is connected in fluid communication with said channel, a compliant element being exposed to fluid pressure in said cavity and being deflectable by hydraulic fluid pressure conducted from said channel to said cavity.

73. An apparatus as set forth in claim 61 wherein said plate member at least partially defines a first cavity which is connected in fluid communication with said channel at a first location and a second cavity which is connected in fluid communication with said channel at a second location which is spaced from said first location, a first compliant element being exposed to fluid pressure in said first cavity, and a second compliant element being exposed to fluid pressure in said second cavity.

74. An apparatus as set forth in claim 61 wherein said pump unit is connected in fluid communication with said outlet from said channel along a flow path which extends along said drive shaft.

75. An apparatus as set forth in claim 61 further including a motor connected with said drive shaft, said motor being disposed adjacent to a side of said plate member opposite from the major side surface of said plate member from which said channel extends inward.

76. An apparatus comprising:
   a reservoir adapted to hold hydraulic fluid;
   a pump unit having an inlet and an outlet;
   a plate member connected with said pump unit, said plate member having a major side surface and a channel which extends inward from said major side surface, said channel having a first portion in fluid communication with said reservoir and a second portion in fluid communication with said inlet of said pump unit, said channel having a longitudinal central axis with a curving configuration;
   a tubular stem extending from said plate member in a direction away from said pump unit;
   a motor stator connected with and extending around said tubular stem;
   a motor rotor extending around an outer periphery of said motor stator and rotatable relative to said motor stator; and
   a drive shaft connected with said motor rotor and said pump unit, at least a portion of said drive shaft is disposed in said tubular stem.

77. An apparatus as set forth in claim 76 wherein said pump unit is a gear pump having a plurality of gears disposed in meshing engagement, one of said gears of said plurality of gears being rotatable with said drive shaft about an axis which extends through said plate member.

78. An apparatus as set forth in claim 76 wherein said plate member at least partially defines a cavity which is connected in fluid communication with said channel to enable fluid pressure to be conducted from said channel to said cavity.

79. An apparatus as set forth in claim 76 wherein said plate member at least partially defines a first cavity which is connected with said channel at a first location and a second cavity which is spaced from said first cavity and is connected with said channel at a second location spaced from said first location.

80. An apparatus as set forth in claim 79 further including a first compliant element exposed to fluid pressure in said first cavity and a second compliant element exposed to fluid pressure in said second cavity, said first and second compliant elements being deflectable under the influence of fluid pressure.

81. An apparatus as set forth in claim 76 wherein said plate member has an opening through which said drive shaft extends, said second portion of said channel has an outlet which is disposed along a first portion of said opening, said plate member at least partially defines a cavity, said cavity having an inlet which is disposed along a second portion of said opening.

82. An apparatus as set forth in claim 81 further including a compliant element exposed to fluid pressure in said cavity, said compliant element being deflectable under the influence of fluid pressure conducted from said opening into said cavity.

83. An apparatus as set forth in claim 76 wherein said channel extends at least part way around a central portion of said plate member, said central portion of said plate member at least partially defines a cavity, said cavity being connected in fluid communication with said channel at a location between opposite ends of said channel, and a compliant element exposed to fluid pressure in said cavity.

84. An apparatus as set forth in claim 76 wherein said plate member has a circular configuration, said first portion of said channel having an inlet adjacent to a circular periphery of said plate member, said second portion of said channel having an outlet which is disposed in a central portion of said plate member and is offset from a center of curvature of said circular periphery of said plate member.

85. An apparatus as set forth in claim 76 wherein said drive shaft extends through an opening in said plate member, said channel having an outlet which is connected in fluid communication with the opening in said plate member.

86. An apparatus comprising:
   a reservoir adapted to hold hydraulic fluid;
   a pump unit having an inlet and an outlet; and
   a plate member connected with said pump unit, said plate member having a major side surface and a channel which extends inward from said major side surface, said channel having a first portion in fluid communication with said reservoir and a second portion in fluid communication with said inlet of said pump unit, said channel having a longitudinal central axis with a curving configuration;
   said plate member at least partially defines a cavity which is connected in fluid communication with said channel; and
   a compliant element exposed to fluid pressure in said cavity and deflectable by hydraulic fluid pressure conducted from said channel to said cavity.

87. An apparatus as set forth in claim 86 wherein said first portion of said channel has a first center of curvature disposed in a central portion of said plate member and said second portion of said channel has a second center of curvature disposed in the central portion of said plate member, said channel having an inlet adjacent to a peripheral portion of said plate member and an outlet at the central portion of said plate member.

88. An apparatus as set forth in claim 86 wherein said pump unit includes a gear pump having gears with meshing teeth, one of said gears being rotatable about an axis which extends transverse to a longitudinal central axis of said channel.

89. An apparatus as set forth in claim 88 wherein said channel has an inlet adjacent to a peripheral portion of said plate member and an outlet adjacent to the axis about which said one gear is rotatable.

90. An apparatus as set forth in claim 86 further including a drive shaft having a first end portion connected with said one gear and extending through an opening in said plate member, said channel having an inlet adjacent to a peripheral portion of said plate member and an outlet adjacent to the opening in said plate member through which drive shaft extends.

91. An apparatus as set forth in claim 90 wherein said pump unit is connected in fluid communication with said outlet from said channel along a flow path which extends along said drive shaft.

92. An apparatus as set forth in claim 90 further including a motor connected with said drive shaft, said motor being disposed adjacent to a side of said plate member opposite from the major side surface of said plate member from which said channel extends inward.

93. An apparatus as set forth in claim 86 wherein said first and second portions of said channel have curving central axes which extend parallel to said major side surface of said plate member.

94. An apparatus as set forth in claim 86 wherein said first and second portions of said channel have arcuately curving configurations, said first portion of said channel being disposed between said second portion of said channel and a periphery of said plate member.

95. An apparatus as set forth in claim 86 further including a tubular stem extending from said plate member in a direction away from said pump unit, a motor stator connected with and extending around said tubular stem, a motor rotor extending around an outer periphery of said motor stator and rotatable relative to said motor stator, and a drive shaft connected with said motor rotor and said pump unit, at least a portion of said drive shaft is disposed in said tubular stem.

96. An apparatus as set forth in claim 95 wherein said drive shaft extends through an opening in said plate member, said channel having an outlet which is connected in fluid communication with the opening in said plate member.

97. An apparatus for use in pumping fluid, said apparatus comprising:

a reservoir adapted to hold hydraulic fluid;

a pump unit having an inlet and an outlet, said pump unit includes a first plate member; and a second plate member connected with said pump unit;

one of said first and second plate members includes a channel covered by the other of said first and second plate members, said channel having a first portion in fluid communication with said reservoir and a second portion in fluid communication with said pump inlet, said one plate member at least partially defines a cavity connected in fluid communication with said channel; and a compliant element exposed to fluid pressure in said cavity.

98. An apparatus as set forth in claim 97 wherein said channel has a serpentine configuration.

99. An apparatus as set forth in claim 97 wherein said channel is formed by a valley in said one of said first and second plate members.

100. An apparatus as set forth in claim 97 wherein said channel has a serpentine configuration and is formed by a valley in said one of said first and second plate members.

* * * * *